US012370577B2

(12) United States Patent
Buckland et al.

(10) Patent No.: US 12,370,577 B2
(45) Date of Patent: *Jul. 29, 2025

(54) BLOCKING PLATE STRUCTURE FOR IMPROVED ACOUSTIC TRANSMISSION EFFICIENCY

(71) Applicant: Ultrahaptics IP Limited, Bristol (GB)

(72) Inventors: Justin Rorke Buckland, Cambridge (GB); Adam John Robert Jackson, Cambridge (GB); Amaru Daniel Araya-Williams, Cambridge (GB); Benjamin John Oliver Long, Bristol (GB); Brian Kappus, Mountain View, CA (US)

(73) Assignee: ULTRAHAPTICS IP LTD, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,653

(22) Filed: Jan. 19, 2024

(65) Prior Publication Data

US 2024/0157399 A1 May 16, 2024

Related U.S. Application Data

(63) Continuation of application No. 18/065,603, filed on Dec. 13, 2022, now Pat. No. 11,883,847, which is a (Continued)

(51) Int. Cl.

| | |
|---|---|
| ***B06B 1/06*** | (2006.01) |
| ***H04R 1/02*** | (2006.01) |

(Continued)

(52) U.S. Cl.

CPC ............. *B06B 1/067* (2013.01); *H04R 1/025* (2013.01); *H04R 1/2811* (2013.01); *F04B 43/046* (2013.01); *F04B 45/047* (2013.01)

(58) Field of Classification Search

CPC ........ H04R 1/025; H04R 1/2811; B06B 1/067

See application file for complete search history.

(56) References Cited

U.S. PATENT DOCUMENTS

| | | | |
|---|---|---|---|
| 4,218,921 | A | 8/1980 | Berge |
| 4,760,525 | A | 7/1988 | Webb |

(Continued)

FOREIGN PATENT DOCUMENTS

| | | | |
|---|---|---|---|
| CA | 2470115 | A1 | 6/2003 |
| CA | 2909804 | A1 | 11/2014 |

(Continued)

OTHER PUBLICATIONS

Steve Guest et al., "Audiotactile interactions in roughness perception", Exp. Brain Res (2002) 146:161-171, DOI 10.1007/s00221-002-1164-z, Received: Feb. 9, 2002/Accepted: May 16, 2002/ Published online: Jul. 26, 2002, Springer-Verlag 2002, (11 pages).

(Continued)

*Primary Examiner* — Sunita Joshi

(74) *Attorney, Agent, or Firm* — Koffsky Schwalb LLC; Mark I. Koffsky

(57) ABSTRACT

An acoustic matching structure is used to increase the power radiated from a transducing element with a higher impedance into a surrounding acoustic medium with a lower acoustic impedance. The acoustic matching structure consists of a thin, substantially planar cavity bounded by a two end walls and a side wall. The end walls of the cavity are formed by a blocking plate wall and a transducing element wall separated by a short distance (less than one quarter of the wavelength of acoustic waves in the surrounding medium at the operating frequency). The end walls and side wall bound a cavity with diameter approximately equal to half of the wavelength of acoustic waves in the surrounding medium. In operation, a transducing element generates acoustic oscillations in the fluid in the cavity. The transduc- (Continued)

ing element may be an actuator which generates motion of an end wall in a direction perpendicular to the plane of the cavity to excite acoustic oscillations in the fluid in the cavity, and the cavity geometry and resonant amplification increase the amplitude of the resulting pressure oscillation. The cavity side wall or end walls contain at least one aperture positioned away from the center of the cavity to allow pressure waves to propagate into the surrounding acoustic medium.

20 Claims, 14 Drawing Sheets

Related U.S. Application Data continuation of application No. 17/164,345, filed on Feb. 1, 2021, now Pat. No. 11,529,650, which is a continuation of application No. 16/401,148, filed on May 2, 2019, now Pat. No. 10,911,861.

(60) Provisional application No. 62/789,261, filed on Jan. 7, 2019, provisional application No. 62/665,867, filed on May 2, 2018.

(51) Int. Cl.
*H04R 1/28* (2006.01)
*F04B 43/04* (2006.01)
*F04B 45/047* (2006.01)

(56) References Cited

U.S. PATENT DOCUMENTS

| | | | |
|---|---|---|---|
| 4,771,205 | A | 9/1988 | Mequio |
| 4,881,212 | A | 11/1989 | Takeuchi |
| 5,122,993 | A | 6/1992 | Hikita |
| 5,226,000 | A | 7/1993 | Moses |
| 5,235,986 | A | 8/1993 | Maslak |
| 5,243,344 | A | 9/1993 | Koulopoulos |
| 5,329,682 | A | 7/1994 | Thurn |
| 5,371,834 | A | 12/1994 | Tawel |
| 5,422,431 | A | 6/1995 | Ichiki |
| 5,426,388 | A | 6/1995 | Flora |
| 5,477,736 | A | 12/1995 | Lorraine |
| 5,511,296 | A | 4/1996 | Dias |
| 5,729,694 | A | 3/1998 | Holzrichter |
| 5,859,915 | A | 1/1999 | Norris |
| 6,029,518 | A | 2/2000 | Oeftering |
| 6,193,936 | B1 | 2/2001 | Gardner |
| 6,216,538 | B1 | 4/2001 | Yasuda |
| 6,436,051 | B1 | 8/2002 | Morris |
| 6,503,204 | B1 | 1/2003 | Sumanaweera |
| 6,647,359 | B1 | 11/2003 | Verplank |
| 6,771,294 | B1 | 8/2004 | Pulli |
| 6,772,490 | B2 | 8/2004 | Toda |
| 6,800,987 | B2 | 10/2004 | Toda |
| 7,107,159 | B2 | 9/2006 | German |
| 7,109,789 | B2 | 9/2006 | Spencer |
| 7,182,726 | B2 | 2/2007 | Williams |
| 7,225,404 | B1 | 5/2007 | Zilles |
| 7,284,027 | B2 | 10/2007 | Jennings, III |
| 7,345,600 | B1 | 3/2008 | Fedigan |
| 7,487,662 | B2 | 2/2009 | Schabron |
| 7,497,662 | B2 | 3/2009 | Mollmann |
| 7,577,260 | B1 | 8/2009 | Hooley |
| 7,692,661 | B2 | 4/2010 | Cook |
| RE42,192 | E | 3/2011 | Schabron |
| 7,966,134 | B2 | 6/2011 | German |
| 8,000,481 | B2 | 8/2011 | Nishikawa |
| 8,123,502 | B2 | 2/2012 | Blakey |
| 8,269,168 | B1 | 9/2012 | Axelrod |
| 8,279,193 | B1 | 10/2012 | Birnbaum |
| 8,351,646 | B2 | 1/2013 | Fujimura |
| 8,369,973 | B2 | 2/2013 | Risbo |
| 8,594,350 | B2 | 11/2013 | Hooley |
| 8,607,922 | B1 | 12/2013 | Werner |
| 8,782,109 | B2 | 7/2014 | Tsutsui |
| 8,823,674 | B2 | 9/2014 | Birnbaum |
| 8,833,510 | B2 | 9/2014 | Koh |
| 8,884,927 | B1 | 11/2014 | Cheatham, III |
| 9,208,664 | B1 | 12/2015 | Peters |
| 9,267,735 | B2 | 2/2016 | Funayama |
| 9,421,291 | B2 | 8/2016 | Robert |
| 9,612,658 | B2 | 4/2017 | Subramanian |
| 9,662,680 | B2 | 5/2017 | Yamamoto |
| 9,667,173 | B1 | 5/2017 | Kappus |
| 9,816,757 | B1 | 11/2017 | Zielinski |
| 9,841,819 | B2 | 12/2017 | Carter |
| 9,863,699 | B2 | 1/2018 | Corbin, III |
| 9,898,089 | B2 | 2/2018 | Subramanian |
| 9,936,908 | B1 | 4/2018 | Acosta |
| 9,945,818 | B2 | 4/2018 | Ganti |
| 9,958,943 | B2 | 5/2018 | Long |
| 9,977,120 | B2 | 5/2018 | Carter |
| 10,101,811 | B2 | 10/2018 | Carter |
| 10,101,814 | B2 | 10/2018 | Carter |
| 10,133,353 | B2 | 11/2018 | Eid |
| 10,140,776 | B2 | 11/2018 | Schwarz |
| 10,146,353 | B1 | 12/2018 | Smith |
| 10,168,782 | B1 | 1/2019 | Tchon |
| 10,268,275 | B2 | 4/2019 | Carter |
| 10,281,567 | B2 | 5/2019 | Carter |
| 10,318,008 | B2 | 6/2019 | Sinha |
| 10,444,842 | B2 | 10/2019 | Long |
| 10,469,973 | B2 | 11/2019 | Hayashi |
| 10,496,175 | B2 | 12/2019 | Long |
| 10,497,358 | B2 | 12/2019 | Tester |
| 10,510,357 | B2 | 12/2019 | Kovesi |
| 10,520,252 | B2 | 12/2019 | Momen |
| 10,523,159 | B2 | 12/2019 | Megretski |
| 10,531,212 | B2 | 1/2020 | Long |
| 10,535,174 | B1 | 1/2020 | Rigiroli |
| 10,569,300 | B2 | 2/2020 | Hoshi |
| 10,593,101 | B1 | 3/2020 | Han |
| 10,599,434 | B1 | 3/2020 | Barrett |
| 10,657,704 | B1 | 5/2020 | Han |
| 10,685,538 | B2 | 6/2020 | Carter |
| 10,755,538 | B2 | 8/2020 | Carter |
| 10,818,162 | B2 | 10/2020 | Carter |
| 10,911,861 | B2 | 2/2021 | Buckland |
| 10,915,177 | B2 | 2/2021 | Carter |
| 10,921,890 | B2 | 2/2021 | Subramanian |
| 10,930,123 | B2 | 2/2021 | Carter |
| 10,943,578 | B2 | 3/2021 | Long |
| 10,991,074 | B2 | 4/2021 | Bousmalis |
| 11,048,329 | B1 | 6/2021 | Lee |
| 11,080,874 | B1 | 8/2021 | Bardagjy |
| 11,098,951 | B2 | 8/2021 | Kappus |
| 11,106,273 | B2 | 8/2021 | Hazra |
| 11,113,860 | B2 | 9/2021 | Rigiroli |
| 11,125,866 | B2 | 9/2021 | Sumi |
| 11,169,610 | B2 | 11/2021 | Sarafianou |
| 11,189,140 | B2 | 11/2021 | Long |
| 11,204,644 | B2 | 12/2021 | Long |
| 11,276,281 | B2 | 3/2022 | Carter |
| 11,350,909 | B2 | 6/2022 | Maresca |
| 11,531,395 | B2 | 12/2022 | Kappus |
| 11,543,507 | B2 | 1/2023 | Carter |
| 11,550,395 | B2 | 1/2023 | Beattie |
| 11,550,432 | B2 | 1/2023 | Carter |
| 11,553,295 | B2 | 1/2023 | Kappus |
| 11,693,113 | B2 | 7/2023 | Bachmann |
| 11,714,492 | B2 | 8/2023 | Carter |
| 11,715,453 | B2 | 8/2023 | Kappus |
| 11,727,790 | B2 | 8/2023 | Carter |
| 11,740,018 | B2 | 8/2023 | Kappus |
| 11,742,870 | B2 | 8/2023 | Long |
| 11,768,540 | B2 | 9/2023 | Long |
| 11,816,267 | B2 | 11/2023 | Kappus |
| 11,842,517 | B2 | 12/2023 | Lyons |
| 11,886,639 | B2 | 1/2024 | Brown |
| 11,921,928 | B2 | 3/2024 | Iodice |

(56) References Cited

U.S. PATENT DOCUMENTS

| | | | |
|---|---|---|---|
| 11,955,109 | B2 | 4/2024 | Long |
| 2001/0007591 | A1 | 7/2001 | Pompei |
| 2001/0033124 | A1 | 10/2001 | Norris |
| 2002/0149570 | A1 | 10/2002 | Knowles |
| 2003/0024317 | A1 | 2/2003 | Miller |
| 2003/0144032 | A1 | 7/2003 | Brunner |
| 2003/0182647 | A1 | 9/2003 | Radeskog |
| 2004/0005715 | A1 | 1/2004 | Schabron |
| 2004/0014434 | A1 | 1/2004 | Haardt |
| 2004/0052387 | A1 | 3/2004 | Norris |
| 2004/0091119 | A1 | 5/2004 | Duraiswami |
| 2004/0210158 | A1 | 10/2004 | Organ |
| 2004/0226378 | A1 | 11/2004 | Oda |
| 2004/0264707 | A1 | 12/2004 | Yang |
| 2005/0052714 | A1 | 3/2005 | Klug |
| 2005/0056851 | A1 | 3/2005 | Althaus |
| 2005/0148874 | A1 | 7/2005 | Brock-Fisher |
| 2005/0212760 | A1 | 9/2005 | Marvit |
| 2005/0226437 | A1 | 10/2005 | Pellegrini |
| 2005/0267695 | A1 | 12/2005 | German |
| 2005/0273483 | A1 | 12/2005 | Dent |
| 2006/0085049 | A1 | 4/2006 | Cory |
| 2006/0090955 | A1 | 5/2006 | Cardas |
| 2006/0091301 | A1 | 5/2006 | Trisnadi |
| 2006/0164428 | A1 | 7/2006 | Cook |
| 2007/0036492 | A1 | 2/2007 | Lee |
| 2007/0056374 | A1 | 3/2007 | Andrews |
| 2007/0094317 | A1 | 4/2007 | Wang |
| 2007/0177681 | A1 | 8/2007 | Choi |
| 2007/0214462 | A1 | 9/2007 | Boillot |
| 2007/0236450 | A1 | 10/2007 | Colgate |
| 2007/0263741 | A1 | 11/2007 | Erving |
| 2008/0012647 | A1 | 1/2008 | Risbo |
| 2008/0027686 | A1 | 1/2008 | Mollmann |
| 2008/0084789 | A1 | 4/2008 | Altman |
| 2008/0130906 | A1 | 6/2008 | Goldstein |
| 2008/0152191 | A1 | 6/2008 | Fujimura |
| 2008/0226088 | A1 | 9/2008 | Aarts |
| 2008/0273723 | A1 | 11/2008 | Hartung |
| 2008/0300055 | A1 | 12/2008 | Lutnick |
| 2009/0093724 | A1 | 4/2009 | Pernot |
| 2009/0116660 | A1 | 5/2009 | Croft, III |
| 2009/0232684 | A1 | 9/2009 | Hirata |
| 2009/0251421 | A1 | 10/2009 | Bloebaum |
| 2009/0319065 | A1 | 12/2009 | Risbo |
| 2010/0013613 | A1 | 1/2010 | Weston |
| 2010/0016727 | A1 | 1/2010 | Rosenberg |
| 2010/0030076 | A1 | 2/2010 | Vortman |
| 2010/0044120 | A1 | 2/2010 | Richter |
| 2010/0066512 | A1 | 3/2010 | Rank |
| 2010/0085168 | A1 | 4/2010 | Kyung |
| 2010/0103246 | A1 | 4/2010 | Schwerdtner |
| 2010/0109481 | A1 | 5/2010 | Buccafusca |
| 2010/0199232 | A1 | 8/2010 | Mistry |
| 2010/0231508 | A1 | 9/2010 | Cruz-Hernandez |
| 2010/0262008 | A1 | 10/2010 | Roundhill |
| 2010/0302015 | A1 | 12/2010 | Kipman |
| 2010/0321216 | A1 | 12/2010 | Jonsson |
| 2011/0006888 | A1 | 1/2011 | Bae |
| 2011/0010958 | A1 | 1/2011 | Clark |
| 2011/0051554 | A1 | 3/2011 | Varray |
| 2011/0066032 | A1 | 3/2011 | Shuki |
| 2011/0199342 | A1 | 8/2011 | Vartanian |
| 2011/0310028 | A1 | 12/2011 | Camp, Jr. |
| 2012/0057733 | A1 | 3/2012 | Morii |
| 2012/0063628 | A1 | 3/2012 | Rizzello |
| 2012/0066280 | A1 | 3/2012 | Tsutsui |
| 2012/0223880 | A1 | 9/2012 | Birnbaum |
| 2012/0229400 | A1 | 9/2012 | Birnbaum |
| 2012/0229401 | A1 | 9/2012 | Birnbaum |
| 2012/0236689 | A1 | 9/2012 | Brown |
| 2012/0243374 | A1 | 9/2012 | Dahl |
| 2012/0249409 | A1 | 10/2012 | Toney |
| 2012/0249474 | A1 | 10/2012 | Pratt |
| 2012/0299853 | A1 | 11/2012 | Dagar |
| 2012/0307649 | A1 | 12/2012 | Park |
| 2012/0315605 | A1 | 12/2012 | Cho |
| 2013/0035582 | A1 | 2/2013 | Radulescu |
| 2013/0079621 | A1 | 3/2013 | Shoham |
| 2013/0094678 | A1 | 4/2013 | Scholte |
| 2013/0100008 | A1 | 4/2013 | Marti |
| 2013/0101141 | A1 | 4/2013 | McElveen |
| 2013/0173658 | A1 | 7/2013 | Adelman |
| 2013/0271397 | A1 | 10/2013 | MacDougall |
| 2013/0331705 | A1 | 12/2013 | Fraser |
| 2014/0027201 | A1 | 1/2014 | Islam |
| 2014/0104274 | A1 | 4/2014 | Hilliges |
| 2014/0139071 | A1 | 5/2014 | Yamamoto |
| 2014/0168091 | A1 | 6/2014 | Jones |
| 2014/0201666 | A1 | 7/2014 | Bedikian |
| 2014/0204002 | A1 | 7/2014 | Bennet |
| 2014/0265572 | A1 | 9/2014 | Siedenburg |
| 2014/0267065 | A1 | 9/2014 | Levesque |
| 2014/0269207 | A1 | 9/2014 | Baym |
| 2014/0269208 | A1 | 9/2014 | Baym |
| 2014/0269214 | A1 | 9/2014 | Baym |
| 2014/0270305 | A1 | 9/2014 | Baym |
| 2014/0320436 | A1 | 10/2014 | Modarres |
| 2014/0361988 | A1 | 12/2014 | Katz |
| 2014/0369514 | A1 | 12/2014 | Baym |
| 2015/0002477 | A1 | 1/2015 | Cheatham, III |
| 2015/0005039 | A1 | 1/2015 | Liu |
| 2015/0006645 | A1 | 1/2015 | Oh |
| 2015/0007025 | A1 | 1/2015 | Sassi |
| 2015/0013023 | A1 | 1/2015 | Wang |
| 2015/0019299 | A1 | 1/2015 | Harvey |
| 2015/0022466 | A1 | 1/2015 | Levesque |
| 2015/0029155 | A1 | 1/2015 | Lee |
| 2015/0066445 | A1 | 3/2015 | Lin |
| 2015/0070147 | A1 | 3/2015 | Cruz-Hernandez |
| 2015/0070245 | A1 | 3/2015 | Han |
| 2015/0078136 | A1 | 3/2015 | Sun |
| 2015/0081110 | A1 | 3/2015 | Houston |
| 2015/0084929 | A1 | 3/2015 | Lee |
| 2015/0110310 | A1 | 4/2015 | Minnaar |
| 2015/0130323 | A1 | 5/2015 | Harris |
| 2015/0168205 | A1 | 6/2015 | Lee |
| 2015/0192995 | A1 | 7/2015 | Subramanian |
| 2015/0209564 | A1 | 7/2015 | Lewin |
| 2015/0220199 | A1 | 8/2015 | Wang |
| 2015/0226537 | A1 | 8/2015 | Schorre |
| 2015/0226831 | A1 | 8/2015 | Nakamura |
| 2015/0241393 | A1 | 8/2015 | Ganti |
| 2015/0248787 | A1 | 9/2015 | Abovitz |
| 2015/0258431 | A1 | 9/2015 | Stafford |
| 2015/0277610 | A1 | 10/2015 | Kim |
| 2015/0293592 | A1 | 10/2015 | Cheong |
| 2015/0304789 | A1 | 10/2015 | Babayoff |
| 2015/0309629 | A1 | 10/2015 | Amariutei |
| 2015/0323667 | A1 | 11/2015 | Przybyla |
| 2015/0331576 | A1 | 11/2015 | Piya |
| 2015/0332075 | A1 | 11/2015 | Burch |
| 2016/0019762 | A1 | 1/2016 | Levesque |
| 2016/0019879 | A1 | 1/2016 | Daley |
| 2016/0026253 | A1 | 1/2016 | Bradski |
| 2016/0044417 | A1 | 2/2016 | Clemen, Jr. |
| 2016/0124080 | A1 | 5/2016 | Carter |
| 2016/0138986 | A1 | 5/2016 | Carlin |
| 2016/0175701 | A1 | 6/2016 | Froy |
| 2016/0175709 | A1 | 6/2016 | Idris |
| 2016/0189702 | A1 | 6/2016 | Blanc |
| 2016/0242724 | A1 | 8/2016 | Lavallee |
| 2016/0246374 | A1 | 8/2016 | Carter |
| 2016/0249150 | A1 | 8/2016 | Carter |
| 2016/0291716 | A1 | 10/2016 | Boser |
| 2016/0306423 | A1 | 10/2016 | Uttermann |
| 2016/0320843 | A1 | 11/2016 | Long |
| 2016/0339132 | A1 | 11/2016 | Cosman |
| 2016/0358477 | A1 | 12/2016 | Ansari |
| 2016/0374562 | A1 | 12/2016 | Vertikov |
| 2017/0002839 | A1 * | 1/2017 | Bukland ............... F04B 45/047 |
| 2017/0004819 | A1 | 1/2017 | Ochiai |
| 2017/0018171 | A1 | 1/2017 | Carter |
| 2017/0024921 | A1 | 1/2017 | Beeler |

(56) References Cited

U.S. PATENT DOCUMENTS

| | | | |
|---|---|---|---|
| 2017/0052148 | A1 | 2/2017 | Estevez |
| 2017/0123487 | A1 | 5/2017 | Hazra |
| 2017/0123499 | A1 | 5/2017 | Eid |
| 2017/0140552 | A1 | 5/2017 | Woo |
| 2017/0144190 | A1 | 5/2017 | Hoshi |
| 2017/0153707 | A1 | 6/2017 | Subramanian |
| 2017/0168586 | A1 | 6/2017 | Sinha |
| 2017/0181725 | A1 | 6/2017 | Han |
| 2017/0193768 | A1 | 7/2017 | Long |
| 2017/0193823 | A1 | 7/2017 | Jiang |
| 2017/0211022 | A1 | 7/2017 | Reinke |
| 2017/0236506 | A1 | 8/2017 | Przybyla |
| 2017/0249932 | A1 | 8/2017 | Maxwell |
| 2017/0270356 | A1 | 9/2017 | Sills |
| 2017/0279951 | A1 | 9/2017 | Hwang |
| 2017/0336860 | A1 | 11/2017 | Smoot |
| 2017/0366908 | A1 | 12/2017 | Long |
| 2018/0035891 | A1 | 2/2018 | Van Soest |
| 2018/0039333 | A1 | 2/2018 | Carter |
| 2018/0047259 | A1 | 2/2018 | Carter |
| 2018/0074580 | A1 | 3/2018 | Hardee |
| 2018/0081439 | A1 | 3/2018 | Daniels |
| 2018/0101234 | A1 | 4/2018 | Carter |
| 2018/0139557 | A1 | 5/2018 | Ochiai |
| 2018/0146306 | A1 | 5/2018 | Benattar |
| 2018/0151035 | A1 | 5/2018 | Maalouf |
| 2018/0166063 | A1 | 6/2018 | Long |
| 2018/0181203 | A1 | 6/2018 | Subramanian |
| 2018/0182372 | A1 | 6/2018 | Tester |
| 2018/0190007 | A1 | 7/2018 | Panteleev |
| 2018/0246576 | A1 | 8/2018 | Long |
| 2018/0253627 | A1 | 9/2018 | Baradel |
| 2018/0267156 | A1 | 9/2018 | Carter |
| 2018/0271494 | A1 | 9/2018 | Cuscuna |
| 2018/0304310 | A1 | 10/2018 | Long |
| 2018/0309515 | A1 | 10/2018 | Murakowski |
| 2018/0310111 | A1 | 10/2018 | Kappus |
| 2018/0350339 | A1 | 12/2018 | Macours |
| 2018/0361174 | A1 | 12/2018 | Radulescu |
| 2019/0001129 | A1 | 1/2019 | Rosenbluth |
| 2019/0038496 | A1 | 2/2019 | Levesque |
| 2019/0091565 | A1 | 3/2019 | Nelson |
| 2019/0163275 | A1 | 5/2019 | Iodice |
| 2019/0175077 | A1 | 6/2019 | Zhang |
| 2019/0187244 | A1 | 6/2019 | Riccardi |
| 2019/0196578 | A1 | 6/2019 | Iodice |
| 2019/0196591 | A1 | 6/2019 | Long |
| 2019/0197840 | A1 | 6/2019 | Kappus |
| 2019/0197841 | A1 | 6/2019 | Carter |
| 2019/0197842 | A1 | 6/2019 | Long |
| 2019/0204925 | A1 | 7/2019 | Long |
| 2019/0206202 | A1 | 7/2019 | Carter |
| 2019/0235628 | A1 | 8/2019 | Lacroix |
| 2019/0257932 | A1 | 8/2019 | Carter |
| 2019/0310710 | A1 | 10/2019 | Deeley |
| 2019/0342654 | A1 | 11/2019 | Buckland |
| 2020/0042091 | A1 | 2/2020 | Long |
| 2020/0080776 | A1 | 3/2020 | Kappus |
| 2020/0082221 | A1 | 3/2020 | Tsai |
| 2020/0082804 | A1 | 3/2020 | Kappus |
| 2020/0103974 | A1 | 4/2020 | Carter |
| 2020/0117229 | A1 | 4/2020 | Long |
| 2020/0193269 | A1 | 6/2020 | Park |
| 2020/0218354 | A1 | 7/2020 | Beattie |
| 2020/0257371 | A1 | 8/2020 | Sung |
| 2020/0294299 | A1 | 9/2020 | Rigiroli |
| 2020/0302760 | A1 | 9/2020 | Carter |
| 2020/0320347 | A1 | 10/2020 | Nikolenko |
| 2020/0327418 | A1 | 10/2020 | Lyons |
| 2020/0380832 | A1 | 12/2020 | Carter |
| 2021/0037332 | A1 | 2/2021 | Kappus |
| 2021/0043070 | A1 | 2/2021 | Carter |
| 2021/0056693 | A1 | 2/2021 | Cheng |
| 2021/0109712 | A1 | 4/2021 | Oliver |
| 2021/0111731 | A1 | 4/2021 | Oliver |
| 2021/0112353 | A1 | 4/2021 | Brian |
| 2021/0141458 | A1 | 5/2021 | Sarafianou |
| 2021/0165491 | A1 | 6/2021 | Sun |
| 2021/0170447 | A1 | 6/2021 | Buckland |
| 2021/0183215 | A1 | 6/2021 | Carter |
| 2021/0201884 | A1 | 7/2021 | Kappus |
| 2021/0225355 | A1 | 7/2021 | Long |
| 2021/0275141 | A1 | 9/2021 | Eckersley |
| 2021/0303072 | A1 | 9/2021 | Carter |
| 2021/0303758 | A1 | 9/2021 | Long |
| 2021/0334706 | A1 | 10/2021 | Yamaguchi |
| 2021/0381765 | A1 | 12/2021 | Kappus |
| 2021/0397261 | A1 | 12/2021 | Kappus |
| 2022/0000447 | A1 | 1/2022 | Eibl |
| 2022/0035479 | A1 | 2/2022 | Lasater |
| 2022/0083142 | A1 | 3/2022 | Brown |
| 2022/0095068 | A1 | 3/2022 | Kappus |
| 2022/0113806 | A1 | 4/2022 | Long |
| 2022/0155949 | A1 | 5/2022 | Ring |
| 2022/0198892 | A1 | 6/2022 | Carter |
| 2022/0236806 | A1 | 7/2022 | Carter |
| 2022/0252550 | A1 | 8/2022 | Catsis |
| 2022/0300028 | A1 | 9/2022 | Long |
| 2022/0300070 | A1 | 9/2022 | Iodice |
| 2022/0329250 | A1 | 10/2022 | Long |
| 2022/0393095 | A1 | 12/2022 | Chilles |
| 2023/0036123 | A1 | 2/2023 | Long |
| 2023/0075917 | A1 | 3/2023 | Pittera |
| 2023/0117919 | A1 | 4/2023 | Michele |
| 2023/0124704 | A1 | 4/2023 | Rorke |
| 2023/0141896 | A1 | 5/2023 | Liu |
| 2023/0168228 | A1 | 6/2023 | Kappus |
| 2023/0215248 | A1 | 7/2023 | Lowther |
| 2023/0228857 | A1 | 7/2023 | Carter |
| 2023/0251720 | A1 | 8/2023 | Wren |
| 2023/0259213 | A1 | 8/2023 | Long |
| 2023/0298444 | A1 | 9/2023 | Kappus |
| 2023/0360504 | A1 | 11/2023 | Kappus |
| 2023/0368771 | A1 | 11/2023 | Kappus |
| 2023/0378966 | A1 | 11/2023 | Long |
| 2024/0021072 | A1 | 1/2024 | Carter |
| 2024/0056655 | A1 | 2/2024 | Page |
| 2024/0069640 | A1 | 2/2024 | Long |
| 2024/0095953 | A1 | 3/2024 | Lyons |
| 2024/0096183 | A1 | 3/2024 | Carter |

FOREIGN PATENT DOCUMENTS

| | | | |
|---|---|---|---|
| CN | 101986787 | | 3/2011 |
| CN | 102459900 | | 5/2012 |
| CN | 102591512 | | 7/2012 |
| CN | 103797379 | | 5/2014 |
| CN | 103984414 | A | 8/2014 |
| CN | 107340871 | A | 11/2017 |
| CN | 107407969 | A | 11/2017 |
| CN | 107534810 | A | 1/2018 |
| EP | 0057594 | A2 | 8/1982 |
| EP | 309003 | | 3/1989 |
| EP | 0696670 | A1 | 2/1996 |
| EP | 1875081 | A1 | 1/2008 |
| EP | 1911530 | | 4/2008 |
| EP | 2271129 | A1 | 1/2011 |
| EP | 1461598 | B1 | 4/2014 |
| EP | 3207817 | A1 | 8/2017 |
| EP | 3216231 | B1 | 8/2019 |
| EP | 3916525 | | 12/2021 |
| GB | 2464117 | | 4/2010 |
| GB | 2513884 | A | 11/2014 |
| GB | 2530036 | | 3/2016 |
| JP | 2008074075 | | 4/2008 |
| JP | 2010109579 | | 5/2010 |
| JP | 2011172074 | | 9/2011 |
| JP | 2012048378 | A | 3/2012 |
| JP | 5477736 | B2 | 4/2014 |
| JP | 2015035657 | A | 2/2015 |
| JP | 2016035646 | | 3/2016 |
| JP | 2017168086 | | 9/2017 |
| JP | 6239796 | | 11/2017 |
| KR | 20120065779 | | 6/2012 |

(56) References Cited

FOREIGN PATENT DOCUMENTS

| | | | |
|---|---|---|---|
| KR | 20130055972 | | 5/2013 |
| KR | 1020130055972 | | 5/2013 |
| KR | 20160008280 | | 1/2016 |
| KR | 20200082449 | A | 7/2020 |
| TW | 201308837 | | 2/2013 |
| WO | 9118486 | | 11/1991 |
| WO | 9639754 | | 12/1996 |
| WO | 03050511 | A | 6/2003 |
| WO | 2005017965 | | 2/2005 |
| WO | 2007144801 | A2 | 12/2007 |
| WO | 2009071746 | A1 | 6/2009 |
| WO | 2009112866 | | 9/2009 |
| WO | 2010003836 | | 1/2010 |
| WO | 2010139916 | | 12/2010 |
| WO | 2011132012 | A1 | 10/2011 |
| WO | 2012023864 | | 2/2012 |
| WO | 2012104648 | A1 | 8/2012 |
| WO | 2013179179 | | 12/2013 |
| WO | 2014181084 | A1 | 11/2014 |
| WO | 2015006467 | | 1/2015 |
| WO | 2015039622 | | 3/2015 |
| WO | 2015127335 | | 8/2015 |
| WO | 2015194510 | | 12/2015 |
| WO | 2016007920 | | 1/2016 |
| WO | 2016073936 | | 5/2016 |
| WO | 2016095033 | A1 | 6/2016 |
| WO | 2016099279 | | 6/2016 |
| WO | 2016132141 | | 8/2016 |
| WO | 2016132144 | | 8/2016 |
| WO | 2016137675 | | 9/2016 |
| WO | 2016162058 | | 10/2016 |
| WO | 2016171651 | | 10/2016 |
| WO | 2017172006 | | 10/2017 |
| WO | 2018109466 | A1 | 6/2018 |
| WO | 2018168562 | A1 | 9/2018 |
| WO | 2019190894 | | 10/2019 |
| WO | 2020049321 | A2 | 3/2020 |
| WO | 2021130505 | A1 | 7/2021 |
| WO | 2021260373 | A1 | 12/2021 |
| WO | 2021262343 | | 12/2021 |

OTHER PUBLICATIONS

Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Sylvia Gebhardt, Ultrasonic Transducer Arrays for Particle Manipulation (date unknown) (2 pages).
Takaaki Kamigaki, Noncontact Thermal and Vibrotactile Display Using Focused Airborne Ultrasound, EuroHaptics 2020, LNCS 12272, pp. 271-278, 2020.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-62.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Tom Carter et al, "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Tomoo Kamakura, Acoustic streaming induced in focused Gaussian beams, J. Acoust. Soc. Am. 97 (5), Pt. 1, May 1995 p. 2740.
Uta Sailer, How Sensory and Affective Attributes Describe Touch Targeting C-Tactile Fibers, Experimental Psychology (2020), 67(4), 224-236.
Vincent Lepetit et al., Model Based Augmentation and Testing of an Annotated Hand Pose Dataset, ResearchGate, https://www.researchgate.net/publication/307910344, Sep. 2016, 13 pages.
Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).
Wang et al., Few-shot adaptive faster r-cnn. In Proceedings of the IEEE/CVF Conference on Computer Vision and Pattern Recognition, pp. 7173-7182. 2019. (Year: 2019).
Wang et al., Device-Free Gesture Tracking Using Acoustic Signals, ACM MobiCom 2016, pp. 82-94 (13 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Wooh et al., "Optimum beam steering of linear phased arays," Wave Motion 29 (1999) pp. 245-265, 21 pages.
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al, "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted 5/15; published 4/16.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
Office Action (Notice of Allowance and Fees Due (PTOL-85)) dated Sep. 12, 2022 for U.S. Appl. No. 16/734,479 (pp. 1-7).
Office Action (Notice of Allowance and Fees Due (PTOL-85)) dated Oct. 12, 2023 for U.S. Appl. No. 18/066,267 (pp. 1-5).
Office Action (Notice of Allowance and Fees Due (PTOL-85)) dated Oct. 18, 2023 for U.S. Appl. No. 17/477,536 (pp. 1-8).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85)) dated Oct. 31, 2022 for U.S. Appl. No. 17/176,899 (pp. 1-2).
Office Action (Notice of Allowance and Fees Due (PTOL-85)) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85)) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).

(56) References Cited

OTHER PUBLICATIONS

Office Action (Notice of Allowance and Fees Due (PTOL-85)) dated Dec. 14, 2021 for U.S. Appl. No. 17/170,841 (pp. 1-8).
Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
Office Action dated Apr. 19, 2023 for U.S. Appl. No. 18/066,267 (pp. 1-11).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 18, 2019 for U.S. Appl. No. 16/296,127 (pp. 1-6).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 22, 2019 for U.S. Appl. No. 16/160,862 (pp. 1-5).
Office Action dated Aug. 9, 2021 for U.S. Appl. No. 17/068,825 (pp. 1-9).
Office Action dated Dec. 11, 2019 for U.S. Appl. No. 15/959,266 (pp. 1-15).
Office Action dated Dec. 7, 2020 for U.S. Appl. No. 16/563,608 (pp. 1-8).
Office Action dated Feb. 20, 2019 for U.S. Appl. No. 15/623,516 (pp. 1-8).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jun. 25, 2021 for U.S. Appl. No. 16/899,720 (pp. 1-5).
Office Action dated Mar. 11, 2021 for U.S. Appl. No. 16/228,767 (pp. 1-23).
Office Action dated Mar. 20, 2020 for U.S. Appl. No. 15/210,661 (pp. 1-10).
Office Action dated Mar. 31, 2021 for U.S. Appl. No. 16/228,760 (pp. 1-21).
Office Action dated May 13, 2021 for U.S. Appl. No. 16/600,500 (pp. 1-9).
Office Action dated May 14, 2021 for U.S. Appl. No. 16/198,959 (pp. 1-6).
Office Action dated May 16, 2019 for U.S. Appl. No. 15/396,851 (pp. 1-7).
Office Action dated May 18, 2020 for U.S. Appl. No. 15/960,113 (pp. 1-21).
Office Action dated Oct. 17, 2019 for U.S. Appl. No. 15/897,804 (pp. 1-10).
Office Action dated Oct. 29, 2021 for U.S. Appl. No. 16/198,959 (pp. 1-7).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 16, 2021 for U.S. Appl. No. 16/600,496 (pp. 1-8).
Office Action dated Sep. 18, 2020 for U.S. Appl. No. 15/396,851 (pp. 1-14).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018. 13 pages.
Mohamed Yacine Tsalamlal, Non-Intrusive Haptic Interfaces: State-of-the Art Survey, HAID 2013, LNCS 7989, pp. 1-9, 2013.
Montenegro et al., "Neural Network as an Alternative to the Jacobian for Iterative Solution to Inverse Kinematics," 2018 Latin American Robotic Symposium, 2018 Brazilian Symposium on Robotics (SBR) and 2018 Workshop on Robotics in Education (WRE) João Pessoa, Brazil, 2018, pp. 333-338 (Year: 2018).
Mueller, GANerated Hands for Real-Time 3D Hand Tracking from Monocular RGB, Eye in-Painting with Exemplar Generative Adverserial Networks, pp. 49-59 (Jun. 1, 2018).
Nina Gaissert, Christian Wallraven, and Heinrich H. Bulthoff, "Visual and Haptic Perceptual Spaces Show High Similarity in Humans", published to Journal of Vision in 2010, available at http://www.journalofvision.org/content/10/11/2 and retrieved on Apr. 22, 2020 ( Year: 2010), 20 pages.
Notice of Allowance dated Feb. 23, 2023 for U.S. Appl. No. 18/060,556 (pp. 1-10).
Notice of Allowance dated Apr. 20, 2021 for U.S. Appl. No. 16/563,608 (pp. 1-5).
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 22, 2021 for U.S. Appl. No. 16/600,500 (pp. 1-9).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated Jun. 10, 2021 for U.S. Appl. No. 17/092,333 (pp. 1-9).
Notice of Allowance dated Jun. 17, 2020 for U.S. Appl. No. 15/210,661 (pp. 1-9).
Notice of Allowance dated Jun. 25, 2021 for U.S. Appl. No. 15/396,851 (pp. 1-10).
Notice of Allowance dated May 30, 2019 for U.S. Appl. No. 15/966,213 (pp. 1-9).
Notice of Allowance dated Nov. 5, 2021 for U.S. Appl. No. 16/899,720 (pp. 1-9).
Notice of Allowance dated Oct. 1, 2020 for U.S. Appl. No. 15/897,804 (pp. 1-9).

(56) References Cited

OTHER PUBLICATIONS

Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowance in U.S. Appl. No. 15/210,661 dated Jun. 17, 2020 (22 pages).
Nuttall, A. (Feb. 1981). Some windows with very good sidelobe behavior. IEEE Transactions on Acoustics, Speech, and Signal Processing. 8 pages.
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI 2013, Apr. 27-May 2, 2013 (10 pages).
Ochiai, Cross-Field Aerial Haptics: Rendering Haptic Feedback in Air with Light and Acoustic Fields, CHI (Year: 2016) 10 pages.
Office Action (Ex Parte Quayle Action) dated Jan. 6, 2023 for U.S. Appl. No. 17/195,795 (pp. 1-6).
Office Action (Ex Parte Quayle Action) dated Jul. 20, 2023 for U.S. Appl. No. 16/843,281 (pp. 1-15).
Office Action (Ex Parte Quayle Action) dated Sep. 18, 2023 for U.S. Appl. No. 18/066,267 (pp. 1-6).
Office Action (Final Rejection) dated Jan. 9, 2023 for U.S. Appl. No. 16/144,474 (pp. 1-16).
Office Action (Final Rejection) dated Mar. 14, 2022 for U.S. Appl. No. 16/564,016 (pp. 1-12).
Office Action (Final Rejection) dated Mar. 21, 2023 for U.S. Appl. No. 16/995,819 (pp. 1-7).
Office Action (Final Rejection) dated Jul. 25, 2023 for U.S. Appl. No. 17/454,823 (pp. 1-17).
Office Action (Final Rejection) dated Aug. 30, 2023 for U.S. Appl. No. 16/564,016 (pp. 1-15).
Office Action (Final Rejection) dated Sep. 16, 2022 for U.S. Appl. No. 16/404,660 (pp. 1-6).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).
Office Action (Final Rejection) dated Dec. 8, 2022 for U.S. Appl. No. 16/229,091 (pp. 1-9).
Office Action (Final Rejection) dated Dec. 15, 2022 for U.S. Appl. No. 16/843,281 (pp. 1-25).
Office Action (Non-Final Rejection) dated Jan. 19, 2024 for U.S. Appl. No. 18/305,354 (pp. 1-4).
Office Action (Non-Final Rejection) dated Jan. 21, 2022 for U.S. Appl. No. 17/068,834 (pp. 1-12).
Office Action (Non-Final Rejection) dated Jan. 24, 2022 for U.S. Appl. No. 16/228,767 (pp. 1-22).
Office Action (Non-Final Rejection) dated Feb. 1, 2024 for U.S. Appl. No. 17/835,411 (pp. 1-7).
EPO Communication for Application 18 811 906.9 (Nov. 29, 2021) (15 pages).
EPO Examination Report 17 748 4656.4 (Jan. 12, 2021) (16 pages).
EPO Examination Report for EP19769198.3 (Jul. 11, 2023) 9 pages.
EPO Examination Search Report 17 702 910.5 (Jun. 23, 2021) 10 pages.
EPO ISR and WO for PCT/GB2022/050204 (Apr. 7, 2022) (15 pages).
EPO Office Action for EP16708440.9 dated Sep. 12, 2018 (7 pages).
EPSRC Grant summary EP/J004448/1 (2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Examination Report for EP 17 826 539.3 (Aug. 2, 2023) (5 pages).
Extended European Search Report for Application No. EP19169929.7, dated Aug. 6, 2019, 7 pages.
First Examination report for ndian Patent Application No. 202247024128 (Aug. 11, 2023) (6 pages).
Freeman et al., Tactile Feedback for Above-Device Gesture Interfaces: Adding Touch to Touchless Interactions ICMI'14, Nov. 12-16, 2014, Istanbul, Turkey (8 pages).
Gareth Young et al.. Designing Mid-Air Haptic Gesture Controlled User Interfaces for Cars, PACM on Human-Computer Interactions, Jun. 2020 (24 pages).
Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Guez, "Solution to the inverse kinematic problem in robotics by neural networks." In Proceedings of the 2nd International Conference on Neural Networks, 1988. San Diego, California. (Year: 1988) 8 pages.
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Henrik Bruus, Acoustofluidics 2: Perturbation theory and ultrasound resonance modes, Lab Chip, 2012, 12, 20-28.
Hilleges et al. Interactions in the air: adding further depth to interactive tabletops, UIST '09: Proceedings of the 22nd annual ACM symposium on User interface software and technologyOct. 2009 pp. 139-148.
Hoshi et al., Tactile Presentation by Airborne Ultrasonic Oscillator Array, Proceedings of Robotics and Mechatronics Lecture 2009, Japan Society of Mechanical Engineers; May 24, 2009 (5 pages).
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
https://radiopaedia.org/articles/physical-principles-of-ultrasound-1?lang=gb (Accessed May 29, 2022).
Hua J, Qin H., Haptics-based dynamic implicit solid modeling, IEEE Trans Vis Comput Graph. Sep.-Oct. 2004;10 (5):574-86.

(56) References Cited

OTHER PUBLICATIONS

Hyunjae Gil, Whiskers: Exploring the Use of Ultrasonic Haptic Cues on the Face, CHI 2018, Apr. 21-26, 2018, Montréal, QC, Canada, 13 pages.
Iddan, et al., "3D Imaging in the Studio (And Elsewhwere . . . " Apr. 2001, 3DV systems Ltd., Yokneam, Isreal, www.3dvsystems.com.il, 9 pages.
IL OA for IL 278402 (Nov. 29, 2023) 4 pages.
Imaginary Phone: Learning Imaginary Interfaces by Transferring Spatial Memory From a Familiar Device Sean Gustafson, Christian Holz and Patrick Baudisch. UIST 2011. (10 pages).
IN 202047026493 Office Action dated Mar. 8, 2022, 6 pages.
India Morrison, The skin as a social organ, Exp Brain Res (2010) 204:305-314.
Inoue, A Pinchable Aerial Virtual Sphere by Acoustic Ultrasound Stationary Wave, IEEE (Year: 2014) 4 pages.
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.
International Search Report and Written Opinion for App. No. PCT/GB2021/051590, dated Nov. 11, 2021, 20 pages.
International Search Report and Written Opinion for Application No. PCT/GB2018/053738, date of mailing Apr. 11, 2019, 14 pages.
International Search Report and Written Opinion for Application No. PCT/GB2018/053739, date of mailing Jun. 4, 2019, 16 pages.
International Search Report and Written Opinion for Application No. PCT/GB2019/050969, date of mailing Jun. 13, 2019, 15 pages.
International Search Report and Written Opinion for Application No. PCT/GB2019/051223, date of mailing Aug. 8, 2019, 15 pages.
International Search Report and Written Opinion for Application No. PCT/GB2019/052510, date of mailing Jan. 14, 2020, 25 pages.
Invitation to Pay Additional Fees for PCT/GB2022/051821 (Oct. 20, 2022), 15 pages.
ISR & WO for PCT/GB2020/052545 (Jan. 27, 2021) 14 pages.
ISR & WO For PCT/GB2021/052946, 15 pages.
ISR & WO for PCT/GB2022/051388 (Aug. 30, 2022) (15 pages).
ISR and WO for PCT/GB2020/050013 (Jul. 13, 2020) (20 pages).
ISR and WO for PCT/GB2020/050926 (Jun. 2, 2020) (16 pages).
ISR and WO for PCT/GB2020/052544 (Dec. 18, 2020) (14 pages).
ISR and WO for PCT/GB2020/052829 (Feb. 10, 2021) (15 pages).
ISR and WO for PCT/GB2021/052415 (Dec. 22, 2021) (16 pages).
ISR and WO for PCT/GB2023/050001 (May 24, 2023) (20 pages).
ISR and WO for PCT/GB2023/052122 (Oct. 18, 2023) 13 pages.
ISR and WO for PCT/GB2023/052612 (Mar. 7, 2024) 18 pages.
ISR for PCT/GB2020/052546 (Feb. 23, 2021) (14 pages).
ISR for PCT/GB2020/053373 (Mar. 26, 2021) (16 pages).
Iwamoto et al. (2008), Non-contact Method for Producing Tactile Sensation Using Airborne Ultrasound, EuroHaptics, pp. 504-513.
Iwamoto et al., Airborne Ultrasound Tactile Display: Supplement, The University of Tokyo 2008 (2 pages).
Iwamoto T et al, "Two-dimensional Scanning Tactile Display using Ultrasound Radiation Pressure", Haptic Interfaces for Virtual Environment and Teleoperator Systems, 2006 14th Symposium on Alexandria, VA, USA Mar. 25-26, 2006, Piscataway, NJ, USA, IEEE, (Mar. 25, 2006), ISBN 978-1-4244-0226-7, pp. 57-61.
Jager et al., "Air-Coupled 40-KHZ Ultrasonic 2D-Phased Array Based on a 3D-Printed Waveguide Structure", 2017 IEEE, 4 pages.
Japanese Office Action (with English language translation) for Application No. 2017-514569, dated Mar. 31, 2019, 10 pages.
JonasChatel-Goldman, Touch increases autonomic coupling between romantic partners, Frontiers in Behavioral Neuroscience Mar. 2014, vol. 8, Article 95.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Jonathan Tompson et al., Real-Time Continuous Pose Recovery of Human Hands Using Convolutional Networks, ACM Trans. Graph. 33, 5, Article 169, Aug. 2014, pp. 1-10.
JP Office Action for JP 2020-534355 (Dec. 6, 2022) (8 pages).
K. Jia, Dynamic properties of micro-particles in ultrasonic transportation using phase-controlled standing waves, J. Applied Physics 116, n. 16 (2014) (12 pages).
Kai Tsumoto, Presentation of Tactile Pleasantness Using Airborne Ultrasound, 2021 IEEE World Haptics Conference (WHC) Jul. 6-9, 2021. Montreal, Canada. 5 pages.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Kamakura, T. and Aoki, K. (2006) "A Highly Directional Audio System using a Parametric Array in Air" WESPAC IX 2006 (8 pages).
Keisuke Hasegawa, Electronically steerable ultrasound-driven long narrow air stream, Applied Physics Letters 111, 064104 (2017) 5 pages.
Keisuke Hasegawa, Midair Ultrasound Fragrance Rendering, IEEE Transactions on Visualization and Computer Graphics, vol. 24, No. 4, Apr. 2018 1477. 9 pages.
Keisuke Hasegawa,,Curved acceleration path of ultrasound-driven air flow, J. Appl. Phys. 125, 054902 (2019); 6 pages.
Ken Wada, Ring Buffer Basics (2013) 6 pages.
Kolb, et al., "Time-of-Flight Cameras in Computer Graphics," Computer Graphics forum, vol. 29 (2010), No. 1, pp. 141-159.
Konstantinos Bousmalis et al., Domain Separation Networks, 29th Conference on Neural Information Processing Systems (NIPS 2016), Barcelona, Spain. Aug. 22, 2016, pp. 1-15.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Large et al.,Feel the noise: Mid-air ultrasound haptics as a novel human-vehicle interaction paradigm, Applied Ergonomics (2019) (10 pages).
Li, Larry, "Time-of-Flight Camera—An Introduction," Texas Instruments, Technical White Paper, SLOA190B—Jan. 2014 Revised May 2014, 10 pages.
Light, E.D., Progress in Two Dimensional Arrays for Real Time Volumetric Imaging, 1998 (17 pages).
Line S Loken, Coding of pleasant touch by unmyelinated afferents in humans, Nature Neuroscience vol. 12 [ No. 5 [ May 2009 547. 2 pages.
M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Mahboob, "Artificial neural networks for learning inverse kinematics of humanoid robot arms." MS Thesis, 2015. (Year: 2015) 95 pages.
Mahdi Rad et al., Feature Mapping for Learning Fast and Accurate 3D Pose Inference from Synthetic Images, Mar. 26, 2018, pp. 1-14.
Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
Mariana von Mohr, The soothing function of touch: affective touch reduces feelings of social exclusion, Scientific Reports, 7: 13516, Oct. 18, 2017.
Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.

(56) References Cited

OTHER PUBLICATIONS

Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Marzo et al., Holographic acoustic elements for manipulation of levitated objects, Nature Communications DOI: I0.1038/ncomms9661 (2015) (7 pages).
Office Action (Non-Final Rejection) dated Mar. 1, 2023 for U.S. Appl. No. 16/564,016 (pp. 1-10).
Office Action (Non-Final Rejection) dated Mar. 4, 2022 for U.S. Appl. No. 16/404,660 (pp. 1-5).
Office Action (Non-Final Rejection) dated Mar. 14, 2024 for U.S. Appl. No. 18/188,584 (pp. 1-5).
Office Action (Non-Final Rejection) dated Mar. 15, 2022 for U.S. Appl. No. 16/144,474 (pp. 1-13).
Office Action (Non-Final Rejection) dated Mar. 22, 2023 for U.S. Appl. No. 17/354,636 (pp. 1-5).
Office Action (Non-Final Rejection) dated Mar. 28, 2024 for U.S. Appl. No. 18/359,951 (pp. 1-5).
Office Action (Non-Final Rejection) dated Apr. 1, 2022 for U.S. Appl. No. 16/229,091 (pp. 1-10).
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 2, 2022 for U.S. Appl. No. 17/068,831 (pp. 1-10).
Office Action (Non-Final Rejection) dated May 8, 2023 for U.S. Appl. No. 18/065,603 (pp. 1-17).
Office Action (Non-Final Rejection) dated May 10, 2023 for U.S. Appl. No. 17/477,536 (pp. 1-13).
Office Action (Non-Final Rejection) dated May 25, 2022 for U.S. Appl. No. 16/843,281 (pp. 1-28).
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Office Action (Non-Final Rejection) dated Aug. 29, 2022 for U.S. Appl. No. 16/995,819 (pp. 1-6).
Office Action (Non-Final Rejection) dated Sep. 7, 2023 for U.S. Appl. No. 16/144,474 (pp. 1-16).
Office Action (Non-Final Rejection) dated Sep. 21, 2022 for U.S. Appl. No. 17/721,315 (pp. 1-10).
Office Action (Non-Final Rejection) dated Sep. 28, 2023 for U.S. Appl. No. 16/995,819 (pp. 1-8).
Office Action (Non-Final Rejection) dated Oct. 3, 2023 for U.S. Appl. No. 18/303,386 (pp. 1-18).
Office Action (Non-Final Rejection) dated Oct. 17, 2022 for U.S. Appl. No. 17/807,730 (pp. 1-8).
Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Office Action (Non-Final Rejection) dated Nov. 16, 2022 for U.S. Appl. No. 17/692,852 (pp. 1-4).
Office Action (Non-Final Rejection) dated Dec. 6, 2022 for U.S. Appl. No. 17/409,783 (pp. 1-7).
Office Action (Non-Final Rejection) dated Dec. 20, 2021 for U.S. Appl. No. 17/195,795 (pp. 1-7).
Office Action (Non-Final Rejection) dated Dec. 22, 2022 for U.S. Appl. No. 17/457,663 (pp. 1-20).
Office Action (Notice of Allowance and Fees Due (PTOL-85)) dated Jan. 18, 2022 for U.S. Appl. No. 16/899,720 (pp. 1-2).
Office Action (Notice of Allowance and Fees Due (PTOL-85)) dated Jan. 31, 2024 for U.S. Appl. No. 18/352,981 (pp. 1-6).
Office Action (Notice of Allowance and Fees Due (PTOL-85)) dated Feb. 11, 2022 for U.S. Appl. No. 16/228,760 (pp. 1-8).
Office Action (Notice of Allowance and Fees Due (PTOL-85)) dated Feb. 28, 2022 for U.S. Appl. No. 17/068,825 (pp. 1-7).
Office Action (Notice of Allowance and Fees Due (PTOL-85)) dated Mar. 7, 2022 for U.S. Appl. No. 16/600,496 (pp. 1-5).
Office Action (Notice of Allowance and Fees Due (PTOL-85)) dated Mar. 8, 2023 for U.S. Appl. No. 17/721,315 (pp. 1-8).
Office Action (Notice of Allowance and Fees Due (PTOL-85)) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85)) dated Apr. 6, 2023 for U.S. Appl. No. 17/807,730 (pp. 1-7).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85)) dated May 12, 2023 for U.S. Appl. No. 16/229,091 (pp. 1-8).
Office Action (Notice of Allowance and Fees Due (PTOL-85)) dated May 24, 2023 for U.S. Appl. No. 16/229,091 (pp. 1-2).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Jul. 20, 2023 for U.S. Appl. No. 17/692,852 (pp. 1-8).
Office Action (Notice of Allowance and Fees Due (PTOL-85)) dated Aug. 2, 2023 for U.S. Appl. No. 16/843,281 (pp. 1-5).
Office Action (Notice of Allowance and Fees Due (PTOL-85)) dated Aug. 8, 2023 for U.S. Appl. No. 17/645,305 (pp. 1-8).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Office Action (Notice of Allowance and Fees Due (PTOL-85)) dated Sep. 11, 2023 for U.S. Appl. No. 18/065,603 (pp. 1-11).
Office Action dated Sep. 21, 2020 for U.S. Appl. No. 16/198,959 (pp. 1-17).
Office Action dated Sep. 24, 2021 for U.S. Appl. No. 17/080,840 (pp. 1-9).
OGRECave/ogre—GitHub: ogre/Samples/Media/materials at 7de80a7483f20b50f2b10d7ac6de9d9c6c87d364, Mar. 26, 2020, 1 page.
Oikonomidis et al., "Efficient model-based 3D tracking of hand articulations using Kinect." In BmVC, vol. 1, No. 2, p. 3. 2011. (Year: 2011).
Optimal regularisation for acoustic source reconstruction by inverse methods, Y. Kim, P.A. Nelson, Institute of Sound and Vibration Research, University of Southampton, Southampton, SO17 1BJ, UK Received Feb. 25, 2003; 25 pages.
Oscar Martinez-Graullera et al, "2D array design based on Fermat spiral for ultrasound imaging", Ultrasonics, (Feb. 1, 2010), vol. 50, No. 2, ISSN 0041-624X, pp. 280-289, XP055210119.
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).
Papoulis, A. (1977). Signal Analysis. The University of Michigan: McGraw-Hill, pp. 92-93.
Partial International Search Report for Application No. PCT/GB2018/053735, date of mailing Apr. 12, 2019, 14 pages.
Partial ISR for Application No. PCT/GB2020/050013 dated May 19, 2020 (16 pages).
Partial ISR for PCT/GB2023/050001 (Mar. 31, 2023) 13 pages.
Patricio Rodrigues, E., Francisco de Oliveira, T., Yassunori Matuda, M., & Buiochi, F. (Sep. 2019). Design and Construction of a 2-D

(56) References Cited

OTHER PUBLICATIONS

Phased Array Ultrasonic Transducer for Coupling in Water. In INTER-NOISE and NOISE-CON Congress and Conference Proceedings (vol. 259, No. 4, pp. 5720-5731). Institute of Noise Control Engineering.
PCT Partial International Search Report for Application No. PCT/GB2018/053404 date of mailing Feb. 25, 2019, 13 pages.
Peter Tamás Kovács et al., "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Prabhu, K. M. (2013). Window Functions and Their Applications in Signal Processing . CRC Press., pp. 87-127.
Rakkolainen et al., A Survey of Mid-Air Ultrasound Haptics and Its Applications (IEEE Transactions on Haptics), vol. 14, No. 1, 2021, 18 pages.
Rocchesso et al., Accessing and Selecting Menu Items by In-Air Touch, ACM CHItaly'19, Sep. 23-25, 2019, Padova, Italy (9 pages).
Rochelle Ackerley, Human C-Tactile Afferents Are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Latex Class Files, vol. 14, No. 8, Aug. 2015.
Schiefler, Generation and Analysis of Ultrasound Images Using Plane Wave and Sparse Arrays Techniques, Sensors (Year: 2018) 23 pages.
Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report by EPO for EP 17748466 dated Jan. 13, 2021 (16 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
Search report for PCT/GB2018/051061 dated Sep. 26, 2018 (17 pages).
Search report for PCT/US2018/028966 dated Jul. 13, 2018 (43 pages).
Seo et al., "Improved numerical inverse kinematics for human pose estimation," Opt. Eng. 50(3 037001 (Mar. 1, 2011) https:// doi.org/10.1117/1.3549255 (Year: 2011).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Sixth Sense webpage, http://www.pranavmistry.com/projects/sixthsense/ Accessed Nov. 30, 2018, 7 pages.
Smart Interface: Piezo Components with Flexible Printed Circuit Boards, www.physikinstrumente.co.uk/en/products/piezo-ceramic-components-transducers-for-oems/smart-interface/ (accessed Sep. 11, 2023) 5 pages.
Stan Melax et al., Dynamics Based 3D Skeletal Hand Tracking, May 22, 2017, pp. 1-8.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
"Flexible piezoelectric transducer for ultrasonic inspection of non-planar components." Ultrasonics 48.5 (2008): 367-375.
"Welcome to Project Soli" video, https://atap.google.com/#project-soli Accessed Nov. 30, 2018, 2 pages.
A. B. Vallbo, Receptive field characteristics of tactile units with myelinated afferents in hairy skin of human subjects, Journal of Physiology (1995), 483.3, pp. 783-795.
A. Sand, Head-Mounted Display with Mid-Air Tactile Feedback, Proceedings of the 21st ACM Symposium on Virtual Reality Software and Technology, Nov. 13-15, 2015 (8 pages).
Aksel Sveier et al.,Pose Estimation with Dual Quaternions and Iterative Closest Point, 2018 Annual American Control Conference (ACC) (8 pages).
Al-Mashhadany, "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages. (Year: 2010).
Alexander, J. et al. (2011), Adding Haptic Feedback to Mobile TV (6 pages).
Almusawi et al., "A new artificial neural network approach in solving inverse kinematics of robotic arm (denso vp6242)." Computational intelligence and neuroscience 2016 (2016). (Year: 2016) 11 pages.
Amanda Zimmerman, The gentle touch receptors of mammalian skin, Science, Nov. 21, 2014, vol. 346 Issue 6212, p. 950.
Andre J. Duerinckx, Matched gaussian apodization of pulsed acoustic phased arrays, Ultrasonic Imaging, vol. 2, Issue 4, Oct. 1980, pp. 338-369.
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Aoki et al., Sound location of stero reproduction with parametric loudspeakers, Applied Acoustics 73 (2012) 1289-1295 (7 pages).
Ashish Shrivastava et al., Learning from Simulated and Unsupervised Images through Adversarial Training, Jul. 19, 2017, pp. 1-16.
Azad et al., Deep domain adaptation under deep label scarcity. arXiv preprint arXiv:1809.08097 (2018) (Year: 2018) 10 pages.

(56) References Cited

OTHER PUBLICATIONS

Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Benjamin Long et al, "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Beranek, L., & Mellow, T. (2019). Acoustics: Sound Fields, Transducers and Vibration. Academic Press, 3 pages.
Bortoff et al., Pseudolinearization of the Acrobot using Spline Functions, IEEE Proceedings of the 31st Conference on Decision and Control, Sep. 10, 1992 (6 pages).
Boureau et al.,"A theoretical analysis of feature pooling in visual recognition." In Proceedings of the 27th international conference on machine learning (ICML-10), pp. 111-118. 2010. (Year: 2010).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Canada Application 2,909,804 Office Action dated Oct. 18, 2019, 4 pages.
Cappellari et al., "Identifying Electromyography Sensor Placement using Dense Neural Networks." In Data, pp. 130-141. 2018. ( Year: 2018).
Casper et al., Realtime Control of Multiple-focus Phased Array Heating Patterns Based on Noninvasive Ultrasound Thermography, IEEE Trans Biomed Eng. Jan. 2012; 59(1): 95-105.
Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
Certon, D., Felix, N., Lacaze, E., Teston, F., & Patat, F. (2001). Investigation of cross-coupling in 1-3 piezocomposite arrays. ieee transactions on ultrasonics, ferroelectrics, and frequency control, 48(1), 85-92.
Chang Suk Lee et al., An electrically switchable visible to infra-red dual frequency cholesteric liquid crystal light shutter, J. Mater. Chem. C, 2018, 6, 4243 (7 pages).
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Communication Pursuant to Article 94(3) EPC for EP 19723179.8 (Feb. 15, 2022), 10 pages.
Corrected Notice of Allowability dated Aug. 9, 2021 for U.S. Appl. No. 15/396,851 (pp. 1-6).
Corrected Notice of Allowability dated Jan. 14, 2021 for U.S. Appl. No. 15/897,804 (pp. 1-2).
Corrected Notice of Allowability dated Jun. 21, 2019 for U.S. Appl. No. 15/966,213 (2 pages).
Corrected Notice of Allowability dated Nov. 24, 2021 for U.S. Appl. No. 16/600,500 (pp. 1-5).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry" according to Wikipedia, 25 pages., Retrieved Nov. 2018.
Definition of "Multilateration" according to Wikipedia, 7 pages., Retrieved Nov. 2018.
Definition of"Trilateration"according to Wikipedia, 2 pages., Retrieved Nov. 2018.
Der et al., Inverse kinematics for reduced deformable models. ACM Transactions on graphics (TOG) 25, No. 3 (2006): 1174-1179. (Year: 2006).
DeSilets, C. S. (1978). Transducer arrays suitable for acoustic imaging (No. GL-2833). Stanford Univ CA Edward L Ginzton Lab of Physics. 5 pages.
Diederik P. Kingma et al., Adam: A Method for Stochastic Optimization, Jan. 30, 2017, pp. 1-15.
Duka, "Neural network based inverse kinematics solution for trajectory tracking of a robotic arm." Procedia Technology 12 (2014) 20-27. (Year: 2014).
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO 21186570.4 Extended Search Report dated Oct. 29, 2021, 10 pages.
EPO Application 18 725 358.8 Examination Report Dated Sep. 22, 2021, 15 pages.

* cited by examiner

BLOCKING PLATE STRUCTURE FOR IMPROVED ACOUSTIC TRANSMISSION EFFICIENCY

PRIOR APPLICATIONS

This application claims benefit to the following two provisional applications:

1) U.S. Provisional Application Ser. No. 62/665,867, filed May 2, 2018; and
2) U.S. Provisional Application Ser. No. 62/789,261, filed Jan. 7, 2019.

FIELD OF THE DISCLOSURE

The present disclosure relates generally to improving acoustic transmission efficiency by incorporating acoustic matching structures into acoustic transducers.

BACKGROUND

Acoustic transducers convert one form of energy, typically electrical, into acoustic (pressure) waves. The proportion of energy that is emitted from the transducer into the surrounding acoustic medium depends on the acoustic impedance of the medium relative to the transducer. For effective transmission, the impedances should be close to equal. In many applications the acoustic medium will be air or another gaseous medium, which, typically, has an acoustic impedance several orders of magnitude lower than that of the transducing element. This large impedance mismatch leads to poor transmission of energy into the acoustic medium, limiting the amount of acoustic energy emitted by the transducer. Techniques to improve the transmission efficiency involve adding a matching layer, or matching structure, between the transducer and acoustic medium.

Many conventional impedance matching layer approaches require dimensions parallel to the transmission direction be a significant fraction of an acoustic wavelength. This limits their usability for applications that require a very thin or compact solution. A further disadvantage of conventional impedance matching layers is that the low acoustic impedance materials used may require complex manufacturing processes.

SUMMARY

This application describes an acoustic matching structure used to increase the transmission efficiency of an acoustic transducer when emitting into a medium that has an acoustic impedance significantly lower than that of the transducer.

The following terminology identifies parts of the transducer: the transducer consists of an acoustic matching structure and a transducing element. The acoustic matching structure is passive and is designed to improve the efficiency of acoustic transmission from the transducing element to a surrounding acoustic medium. The transducing element generates acoustic output when driven with an electrical input. The transduction mechanism may be by oscillating motion, for example using an electromechanical actuator, or by oscillating temperature, for example, using an electrothermal transducer.

Specifically, an acoustic matching structure is used to increase the power radiated from a transducing element with a higher impedance into a surrounding acoustic medium with a lower acoustic impedance.

The acoustic matching structure consists of a resonant acoustic cavity bounded by an acoustic transducing element and a blocking plate. The resonant acoustic cavity amplifies pressure oscillations generated by the transducing element and the blocking plate contains one or more apertures, which allow pressure oscillations to propagate from the resonant acoustic cavity into the surrounding acoustic medium.

A preferred embodiment of the acoustic matching structure consists of a thin, substantially planar cavity bounded by a two end walls and a side wall. The end walls of the cavity are formed by a blocking plate wall and a transducing element wall separated by a short distance, less than one quarter of the wavelength of acoustic waves in the surrounding acoustic medium at the operating frequency of the transducer. The end walls and side wall bound a cavity with diameter approximately equal to half of the wavelength of acoustic waves in the surrounding acoustic medium. In operation, a transducing element generates acoustic oscillations in the fluid in the cavity. The transducing element may be an actuator which generates motion of an end wall in a direction perpendicular to the plane of the cavity to excite acoustic oscillations in the fluid in the cavity, and the cavity causes resonant amplification of the resulting pressure oscillation. The cavity side wall or end walls contain at least one aperture positioned away from the center of the cavity to allow pressure waves to propagate into the surrounding acoustic medium.

BRIEF DESCRIPTION OF THE FIGURES

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

Figure 1:
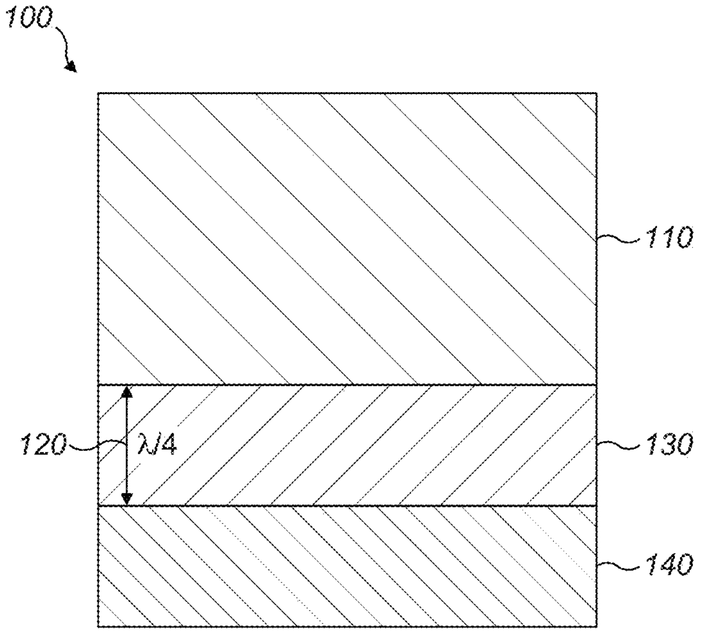
FIG. 1 Prior Art
FIG. 1 is a simplified schematic of a transducer with a simple quarter-wavelength acoustic matching layer.

Those skilled in the art will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Acoustic Matching Layers

In this description, a transducing element directly refers to the portion of the structure that converts energy to acoustic energy. An actuator refers to the portion of the solid structure that contains the kinetic energy before transferring it to the medium.

The specific acoustic impedance of a gas or material is defined as the ratio of the acoustic pressure and the particle speed associated with that pressure, or $$z = \frac{p}{u}$$

This holds for arbitrary acoustic fields. To simplify this discussion, it is most useful to consider the plane wave solution to the above. This reduces the equation to scalar quantities, $$z = \rho c,$$

for a wave propagating in the same direction as the particle velocity, and where ρ is the density and c is the speed of sound of the medium. The importance of this quantity is highlighted when considering the reflection and transmission from an interface between two acoustic media with differing acoustic impedance. When a plane wave is incident on a medium boundary traveling from material with specific acoustic impedance $z_1$ to $z_2$, the normalized intensity of reflection (R) and transmission (T) is, $$R_I = \left(\frac{z_2 - z_1}{z_1 + z_2}\right)^2,$$

$$T_I = \frac{4 z_2 z_1}{(z_2 + z_1)^2}$$

This shows that when the impedance of the two media have substantially different values, the reflected intensity is much larger than the transmitted intensity. This is the case for most gas coupled acoustic actuators where the actuator is composed of bulk, solid material with acoustic impedance on the order of $Z_1 \approx 10^7$ k·gm$^{-2}$·s$^{-}$and for example, air at sea level and 20° C. at $Z_3 \approx 400$ kg·m$^{-2}$·s$^{-1}$. This results in decreased efficiency and output.

The acoustic impedance of a resonant piezoelectric bending actuator has been analyzed for a 40 kHz actuator (Toda, IEEE Transactions on Ultrasonics, Ferroelectrics, and Frequency Control, Vol. 49, No. 7, July 2002) giving $Z_1 \approx 2 \times 10^4$ kg·m$^{-2}$·s$^{-1}$. Although this resonant bending actuator has a much lower acoustic impedance than the bulk materials from which it is constructed (PZT and aluminum), there remains a substantial difference between the actuator impedance and air impedance, decreasing efficiency and acoustic output.

A solution to this problem is to add an acoustic matching layer with an impedance $Z_2$ which serves as an intermediary between the higher-impedance actuator and the lower-impedance bulk gaseous phase medium.

An acoustic matching layer or other acoustic matching structure is required to be inserted into the path of acoustic energy transfer from the actuator into the medium and is designed to have an acoustic impedance that is as close as possible to the optimal matching structure impedance, that is the geometric mean of the acoustic impedances of the source and the destination, which in some embodiments may be a higher-impedance actuator and the lower-impedance bulk air or other acoustic medium. The effect of the intermediate impedance matching layer is that the energy transfer from the higher impedance region to the matching layer and then from the matching layer to the lower impedance region is more efficient than the more direct energy transfer from the higher to the lower impedance regions.

There may also be a plurality of matching layers that form a chain which is at its most efficient when the logarithms of the acoustic impedances of the endpoints and each matching layer form a chain whose values are progressive and substantially equally spaced.

In the case of a single-material matching layer added to the surface of a transducing element, there are two key properties that must be selected and balanced:

1. The acoustic impedance of the layer, $Z_2$, must be approximately equal to the geometric mean of the impedance of the acoustic source region, which in some embodiments may consist of a piezoelectric source element ($Z_1$) and the impedance of the medium ($Z_3$).
2. The thickness of the layer of bulk material must be approximately equal to a quarter wavelength of the longitudinal pressure waves in the matching layer material at the operating frequency (frequency of pressure oscillations).

These two properties must be tuned and matched, as the thickness of the layer of any given material also impacts the acoustic impedance. It can be seen that there will only be a limited selection of suitable materials, and for some ranges of frequencies this limited selection may be small.

FIG. 1 shows a schematic 100 of a transducer that includes a conventional matching layer. An intermediate layer 130 (with an intermediate acoustic impedance) serves as the matching layer which is added between the actuator 140 and acoustic medium 110 (such as air). The thickness 120 of the intermediate layer 130 is approximately equal to a quarter wavelength of the longitudinal pressure waves in the matching layer at the operating frequency when the matching layer is considered as a bulk material.

Figure 2:
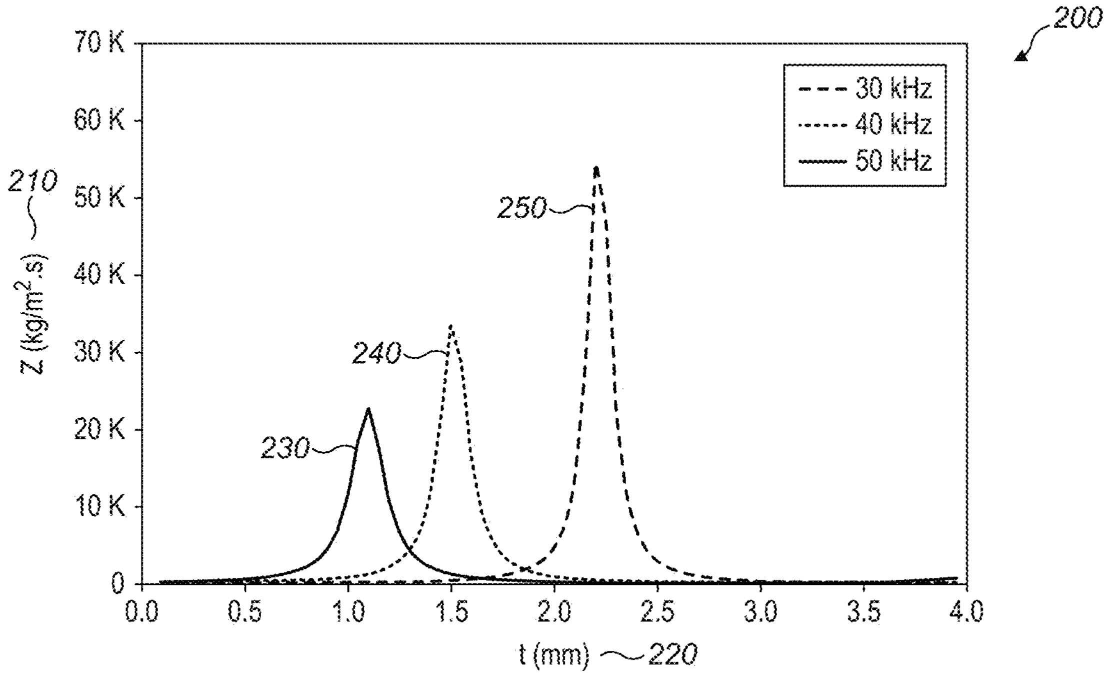
FIG. 2 Prior Art
FIG. 2 is a graph showing calculated acoustic impedance of an acoustic matching structure constructed from a plate.

FIG. 2 is a graph 200 showing calculated acoustic impedance 210 of an acoustic matching structure constructed from a plate of thickness t 220 containing an array of holes, as described in the prior art (Toda, IEEE Transactions on Ultrasonics, Ferroelectrics, and Frequency Control, Vol. 49, No. 7, July 2002). Variation of acoustic impedance with plate thickness is calculated in air for frequencies of 30 kHz, 40 kHz and 50 kHz (250, 240, 230), showing impedance maxima when the plate thickness is equal to ¼ of the acoustic wavelength of air.

Figure 3:
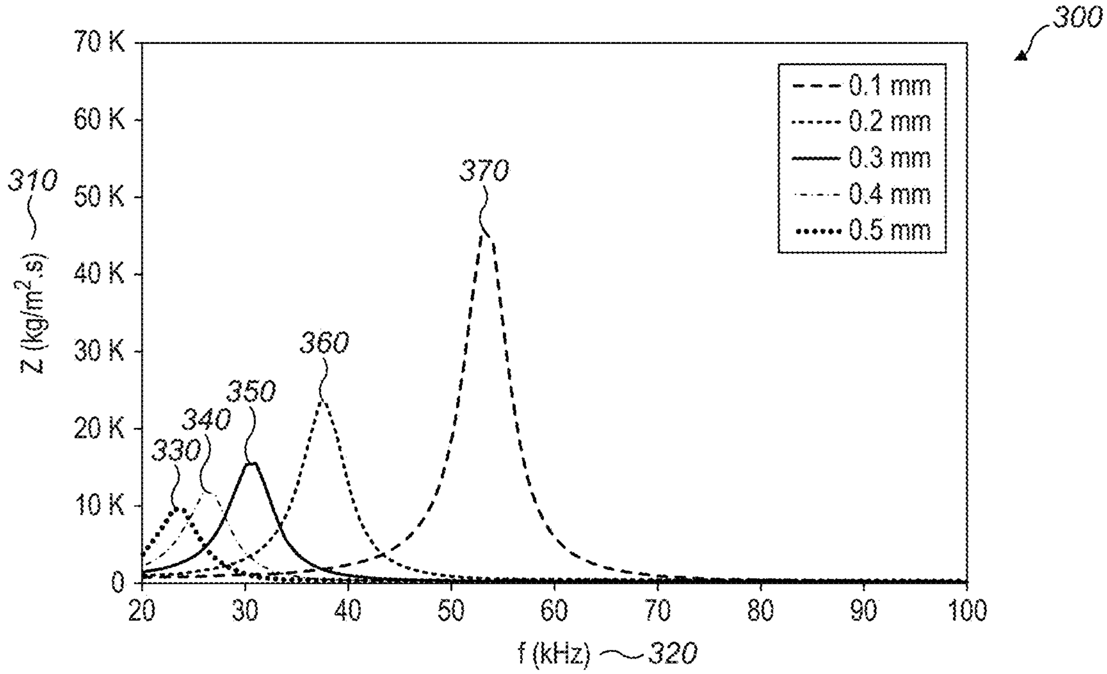
FIG. 3 Prior Art
FIGS. 3, 4 and 5 are graphs showing calculated acoustic impedance of a thin film matching layer.
Figure 4:
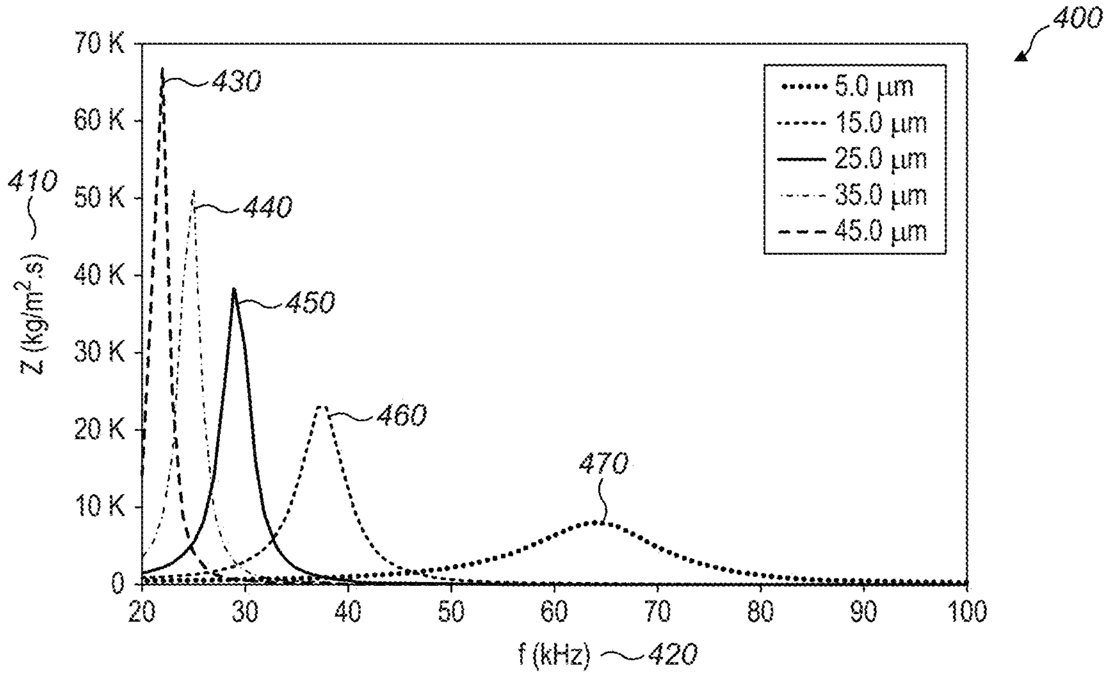
FIG. 4 Prior Art
Figure 5:
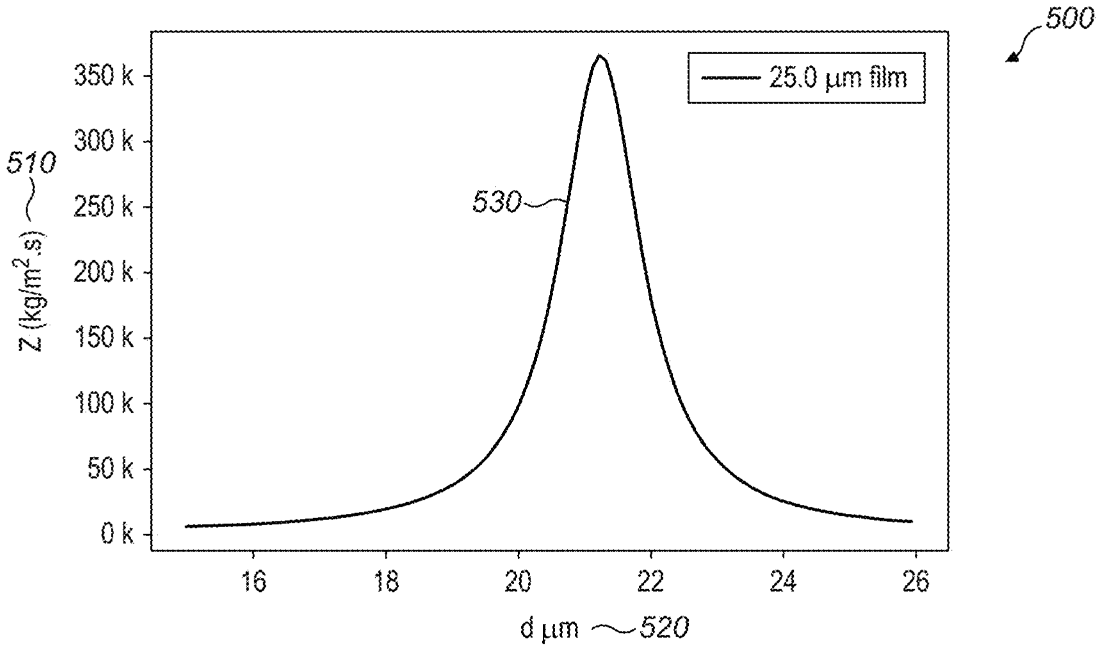
FIG. 5 Prior Art

FIGS. 3, 4 and 5 are graphs 300, 400, 500 showing calculated acoustic impedance of a thin film matching layer, as described in the prior art referenced in the previous paragraph. In FIG. 3, acoustic impedance 310 is plotted against frequency 320 for the case of a 15 μm thick polyethylene film spaced away from a transducing element by an air gap with thickness from 0.1 mm to 0.5 mm (370, 360, 350, 340, 330). In FIG. 4, acoustic impedance 410 is plotted against frequency 420 for a range of film thickness values from 5 μm to 45 μm (470, 460, 450, 440, 430), with the film separated by an air gap of 0.2 mm from a transducing element. In FIG. 5, acoustic impedance 510 is plotted against separation between film and transducing element 520 for a film thickness of 25 μm. The combination of thin film and thin air gap creates a high acoustic impedance 530 when the gap is approximately 20-22 μm.

Figure 6:
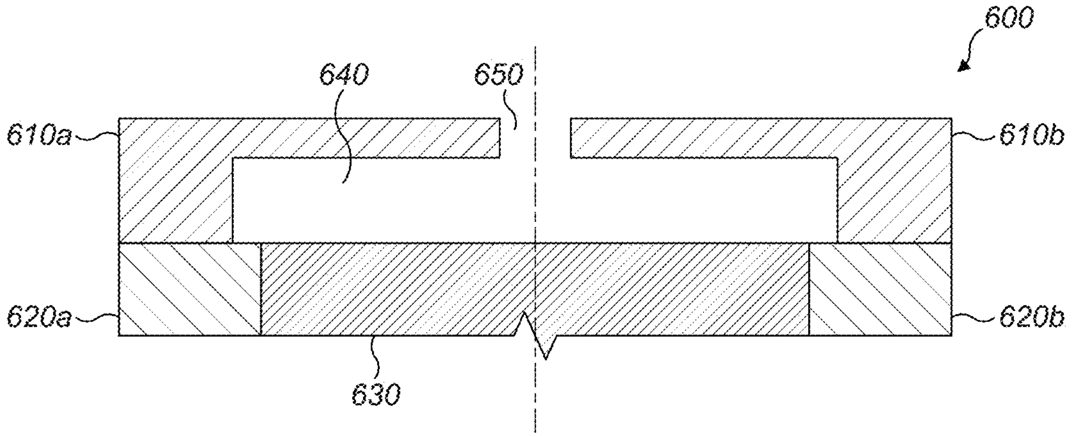
FIG. 6 Prior Art
FIG. 6 is a cross-section of a transducer including a Helmholtz resonator.

FIG. 6 is a cross-section of a transducer including a Helmholtz resonator. The Helmholz resonator 600 has a cavity 640 with dimensions substantially less than ¼ of the acoustic wavelength and spatially uniform pressure, and an aperture 650 typically located at the center of the cavity 640. The cavity is bounded by walls 610*a*, 610*b*, 620*a*, 620*b*.

As an example, the acoustic impedance of a matching layer for a thickness-mode, piezoelectric actuator operating in air may be computed. The acoustic impedance required in this situation is approximately 100,000 $kg \cdot m^{-2} \cdot s^{-1}$. The computation proceeds by taking logarithms of each of the impedances of the adjoining elements, which is found to be approximately 7.5 for the piezoelectric transducing element ($Z_1$) and approximately 2.5 for the bulk air ($Z_3$) at the expected temperature and pressure. Then, for each matching layer required the average of the logarithms of the impedances of the adjoining regions may be used to determine the logarithm of the impedance required for the matching layer. Table 1 shows the acoustic impedance of air and PZT-5A (a piezoelectric material), and the ideal acoustic impedance of a matching layer for a thickness mode piezoelectric actuator operating in air which is $$\frac{7.5 + 2.5}{2} = 5$$

alongside the logarithms of each of the impedances.

TABLE 1

| Material | Acoustic Impedance $kg \cdot m^{-2} \cdot s^{-1}$ | Impedance logarithm |
|---|---|---|
| PZT 5A | 34,000,000 | 7.53 |
| Air (1 atm, 20° C.) | 400 | 2.60 |
| Ideal matching layer | 100,000 | 5.00 |

The acoustic impedances required for an ideal matching layer to bridge this large gap in acoustic impedances must be therefore composed of a solid material with a very low speed of sound and low density. The low speed of sound is preferable in order to reduce the size or volume of material required to make a matching layer that fits the quarter wavelength criterion. The low density is required for the material to have an acoustic impedance that is appropriate to a matching layer. But in general, suitable materials do not occur naturally. They must be often constructed with special manufacturing processes that tend to be complex and difficult to control, leading to variable acoustic properties and variable performance as a matching layer. For examples of such constructed suitable materials, matching layers using glass and resin microspheres are described in U.S. Pat. No. 4,523,122 and a matching layer using a dry gel material is described in U.S. Pat. No. 6,989,625. An ideal matching layer for a typical resonant piezoelectric bending actuator would have even lower acoustic impedance and would be more challenging to construct.

A further problematic issue with low-density, low-speed-of-sound matching layers of suitable materials is the constraint on thickness imposed by the quarter wavelength requirement. The lower the primary operating frequency of the transducing element, the longer the wavelength and the thicker the matching layer must be. For example, the wavelength at 40 kHz in air at ambient pressure and temperature is 8.58 mm. Therefore, assuming the material has a similar speed of sound to that of air—which would itself be difficult to achieve as it would require a high-density but low-stiffness material which would again likely require a specialist process to create—an ideal matching layer would have a thickness close to 2.14 mm. In thickness-constrained applications, this may be too great to be viable, either commercially or for the particular application of interest. Matching layers made of a material with a speed of sound greater than air would need to be thicker than this 2.14 mm.

This invention proposes the use of a vented resonant acoustic cavity formed by placing a blocking plate in the path of the acoustic energy transfer from a transducing element to an acoustic medium to achieve an intermediate acoustic impedance, that is lower acoustic impedance than that of the transducing element and higher acoustic impedance than the surrounding acoustic medium. The intermediate acoustic impedance increases the efficiency of acoustic energy transfer from the transducing element to the acoustic medium, and is provided through the production of a controlled resonant acoustic mode in an acoustic cavity in the path of the transfer of acoustic energy from the transducing element to the acoustic medium. The acoustic cavity that constrains the acoustic medium in a way that gives rise to a resonant acoustic mode in the acoustic medium that can be excited by the transducing element. The blocking plate which forms one face of the acoustic cavity contains apertures that allow acoustic energy to be transmitted from the acoustic cavity into the acoustic medium.

The effective acoustic impedance of the acoustic matching structure can be determined from the definition of acoustic impedance, Z=p/u, that is the ratio of acoustic pressure to particle velocity. In operation, the actuator creates a boundary velocity field in the acoustic medium and is situated on one side of the blocking plate which is placed intentionally in the path of the energy transfer. The actuator and blocking plate form an acoustic cavity substantially bounded by the actuator and the blocking plate. The actuator drives an acoustic wave from the surface of the actuator into the acoustic cavity. As the actuator continues to oscillate with substantially constant displacement amplitude and frequency, resonant acoustic oscillations in the cavity are excited and build in amplitude. The resonant increase in acoustic pressure resulting from substantially constant actuator oscillation velocity amplitude indicates an increase in the effective acoustic impedance of the acoustic cavity relative to the bulk acoustic medium by a factor of $Q_{cavity}$, where $Q_{cavity}$ is the quality factor of the cavity acoustic resonance.

In the structure designed to produce such a resonant acoustic mode, the dimensions can also be arranged and resized so that the close spacing of the blocking plate and actuator increases the effective acoustic impedance of the acoustic medium by confining the fluid to a thin layer and constraining the fluid motion to be substantially parallel to the face of the actuator. In the case of a flat cylindrical cavity, the fluid velocity and pressure are increased by a factor: $f_{geom}=r_{cavity}/(2\ h_{cavity})$, where $r_{cavity}$ is the radius of the cavity and $h_{cavity}$ is the height of the cavity, that is the separation of the actuator and blocking plate, and the effective acoustic impedance of the medium is increased by the same factor $f_{geom}$. Preferably, $r_{cavity}>5\ h_{cavity}$ so that $f_{geom}>2.5$, and more preferably, $r_{cavity}>10\ h_{cavity}$ so that $f_{geom}>5$. The acoustic impedance of the fluid in the cavity is increased relative to the bulk acoustic medium by a factor: $Q_{cavity}\times f_{geom}$, the product of the resonant cavity quality factor and the geometric amplification factor. In this way the acoustic cavity acts as an acoustic matching layer with acoustic impedance higher than the bulk acoustic medium and lower than the actuator.

It is useful to consider the minimum cavity height that can support an acoustic resonance. In order to establish an acoustic resonance in the cavity without excessive viscous losses we require $h_{cavity}>\delta$, where $\delta$ is the viscous boundary layer thickness. For a cylindrical cavity with radius $r_{cavity}$ containing a fluid with speed of sound c, with a pressure node at its perimeter, the first radial acoustic mode has a pressure distribution following a Bessel function of the form:

$$p(r) = J_0\left(\frac{k_0 r}{r_{cavity}}\right);$$

$$k_0 \approx 2.4$$

and the frequency of the first radial acoustic resonance, $f_0$, is given by:

$$f_0 = \frac{k_0 c}{2\pi r_{cavity}}.$$

From this we can derive the condition $$\frac{h_{cavity}^2}{r_{cavity}} > \frac{\delta^2}{r_{cavity}} = \frac{2v}{k_0 c}.$$

For operation in air at 20° C., this $$\frac{h_{cavity}^2}{r_{cavity}} > 3.7\times 10^{-8}\ \text{m}.$$

gives For gases with lower kinematic viscosity and higher speed of sound, this value may be smaller, as low as $1\times 10^{-8}$ m.

However a small cavity height is beneficial as the narrow separation of actuator and blocking plate constrains the acoustic medium and results in an increase in the radial velocity of the acoustic medium in the cavity for a given actuator drive velocity, with a geometric amplification factor $f_{geom}=r_{cavity}/(2\ h_{cavity})$ as described above. The optimal cavity height results from a tradeoff between maximizing the geometric amplification factor, and maximizing the cavity quality factor by minimizing the viscous losses in the boundary layers.

However, as the goal is to transfer the energy into the medium, an aperture is needed to allow acoustic waves to escape from the structure. It is helpful to balance the constraints of the maintenance and conservation of the appropriate acoustic perturbation, wherein a smaller area aperture in the novel matching structure is beneficial, which the requirement that the increased perturbation be transmitted onwards into the acoustic medium, wherein a larger area aperture in the novel matching structure is beneficial. At least some aperture, which may comprise one or many discrete sections, must be added so that a portion of the acoustic output generated by the transducer can escape on every cycle into the bulk medium.

In these embodiments, the term "acoustic medium" refers to the medium inside the cavity through which acoustic waves travel. The "bulk medium" refers to the acoustic medium which exists outside the cavity. The medium can be liquid, such as water, or gas, such as air or any other medium which is distinct from the construction material of the invention. Any medium supporting acoustic waves can be referred to as a "fluid" for the purposes of this discussion.

The process of designing the structure that is to create a suitable resonant mode in the acoustic medium can be illustrated with a simplified boundary value problem. A simple structure can embody the properties described above in the form of an acoustic cavity consisting of a volume of the acoustic medium which has in this example been restricted by a surrounding structure of side walls. The resonant frequency mode structure can be determined by finding solutions to the Helmholtz equation, $$\nabla^2 p + k^2 p = 0$$

with $p=P(x)\exp(j\omega t)$ and $p=c_0^2\rho_1$, with appropriate boundary conditions. In these equations P(x) is the peak pressure deviation from ambient pressure (a spatially varying function of the displacement vector x=[x, y, z] in Cartesian coordinates or function of the displacement vector r=[r, θ, z] in cylindrical coordinates from the cavity origin), p is the complex-valued acoustic pressure, $c_0$ is the speed of sound in the ambient medium, $\rho_1$ is the first-order density deviation from ambient density (where the density is this deviation $\rho_1$ added to the ambient density $\rho_0$, so $\rho=\rho_0+\rho_1$), ω is the acoustic angular frequency, t is time, j is $\sqrt{-1}$, and k is the wavenumber. It can be immediately appreciated that the acoustic pressure, p, can be related to the density, ρ, and thus the acoustic impedance as previously discussed.

As an example using cylindrical coordinates, suitable for a cylindrical cavity, we can consider a cavity with radius $a_{cavity}$ and height $h_{cavity}$. The domain of interest is described by $0 \le r \le a_{cavity}$, $0 \le \theta \le 2\pi$, $0 \le z \le h_{cavity}$. Separation of variables allows for an analytic solution of the form, $$P_{lmn} = A_{min} J_0(k_{rl}\, r) \cos(k_{\theta n}\, \theta) \cos(k_{zn}\, z)\, e^{j\,\omega lmn\, t},$$

Where $J_0$ is the zeroth order Bessel function of the first kind, with the radial wavenumber $k_{rl}$ having values given by Bessel function zeros divided by the cavity radius, $k_{\theta m}$ having integer values ($k_{\theta m}=m$) and $k_{zn}$ having values given by $k_{zn}=2\pi n/h_{cavity}$. The first three values of $k_{rl}$ are given by: $k_{r0}=2.404/a_{cavity}$, $k_{r0}=5.201/a_{cavity}$, $k_{r0}=8.6537/a_{cavity}$. Note that $P_{lmn}=0$ at $r=a_{cavity}$ in this analytical description, corresponding to a zero pressure boundary condition. In practice, this analytical description is not fully accurate, and the boundary condition will be mixed (neither zero pressure nor zero displacement) due to the presence of apertures near $r=a_{cavity}$. However $P_{lmn}$ will be small at $r=a_{cavity}$ compared with its value at r=0, as shown by the results of a numerical simulation shown in FIG. 13.

As an example using Cartesian coordinates, we can work through the determination of the mode structure for the medium volume contained within a rectangular cavity with rigid walls, the origin placed at one corner of the box, with the axes oriented such that the domain of interest is described by x≥0, y≥0 and z≥0. Separation of variables then allows for an analytic solution of the form, $$p_{lmn} = A_{lmn} \cos(k_{xl}\, x) \cos(k_{ym}\, y) \cos(k_{zn}\, z) e^{j\omega_{lmn} t},$$

with the wavenumbers $k_{xl}$, $k_{ym}$ and $k_{zn}$ given by the physical dimensions of the cavity $L_x$, $L_y$, and $L_z$ respectively as:

$$k_{xl} = l\frac{\pi}{L_x},$$

$$k_{ym} = m\frac{\pi}{L_y},$$

$$k_{zn} = n\frac{\pi}{L_z},$$

wherein l, m and n can be substituted for any unique combination of integers to describe each resonant mode of the cavity.

The angular frequency that generates the mode is then given by, $$\omega_{lmn} = c_0\sqrt{k_{xl}^2 + k_{ym}^2 + k_{zn}^2}$$

The amplitude of the wave ($A_{lmn}$) scales with input but in this analysis has no effect on the frequency of the mode.

Let us examine the specific case of the mode l=2, m=2 and n=0 wherein $L_x=L_y=L$. Here the angular frequency is given by $$\omega = \frac{2\sqrt{2}\, c_0 \pi}{L}.$$

The acoustic pressure within the cavity is given by $$p = A\cos\left(\frac{2\pi x}{L}\right)\cos\left(\frac{2\pi y}{L}\right)e^{\frac{j2\sqrt{2}c_0\pi t}{L}},$$

with no dependence on z. The bottom center of the cavity $$(x = \frac{L}{2},\, y = \frac{L}{2})$$

is an acoutstic pressure antinode and experiences the same peak pressure as the walls which can be much higher than the ambient pressure. An actuator placed at this location receives the benefit of working against a higher pressure for a given displacement. The lack of z-dependence in this example means that this cavity achieves this mode even if $L_z$ is very small.

The presence of apertures causes a mixed boundary condition, and this complicates the solution. Furthermore, losses and energy propagation from the transducing element to the external acoustic medium lead to a travelling wave component in the acoustic wave. The result is that there are no perfectly nodal locations, but there are locations of minimum pressure oscillation amplitude.

Aperture(s) which allow acoustic energy to propagate from the cavity to the surrounding acoustic medium are located in areas of lower pressure oscillation amplitude, and transducing elements are located in areas of higher pressure oscillation amplitude.

The description above describes the idealized case of an acoustic mode in a closed, rigid box. In practice, the pressure oscillation amplitude would be reduced near apertures which allow pressure waves to propagate through from the cavity to the external acoustic medium.

There is a minimum necessary $L_z$ related to the viscous penetration depth, $$\delta \approx \sqrt{\frac{v}{\pi f}},$$

where v is the kinematic viscosity of the medium. Significantly smaller than this value will result in energy being lost to heat through thermo-viscous boundary layer effects at the walls. The clear advantage of this solution over a typical matching layer is that it can be much smaller in thickness than $$\frac{\lambda}{4}$$

(where λ is the wavelength) because this utilizes a mode that is not in parallel with the path of acoustic energy transfer to influence the transfer of the acoustic energy.

It need not, however, be small in z as in this example. If desired a tall, thin cavity can be designed with a high-pressure antinode occurring near the actuator. This may be beneficial in applications in which compacting larger numbers of transducers in a small surface area is required, but thickness restrictions are relaxed instead. For instance, take the mode shape l=0, m=0 and n=1 of the acoustic medium as before where in this case $L_z$=L. Here the angular frequency is instead given by $$\omega = \frac{c_0 \pi}{L}$$

and the acoustic pressure is given by $$p = A\cos\left(\frac{\pi z}{L}\right)e^{\frac{jc_0\pi t}{L}}$$

which in this example has only dependence on z. Using a long actuator in the form of a strip that extends away from the aperture and bends with maximum displacement at the opposite location in z is advantageous here. This is because the high-pressure antinode and thus the most suitable instantaneous acoustic impedance must occur in this example at the furthest point where z=L.

Further examples may be constructed, especially in cases where there is at least one dimension that does not have length limiting requirements, as shown in FIG. 17 and FIG. 18.

To achieve even higher acoustic pressure, it may be reasonable to construct a cavity wherein the mode shape is defined by l=0, m=0 and n=3. In this case, there are two antinodes present in the along the length of the acoustic cavity. Unlike the above examples, these antinodes are out of phase and swap every half period of the progressive wave mode present in the cavity. By driving into both antinodes at their respective high-pressure points in the cycle, with two transducers transferring energy with each driven π radians out of phase, higher pressures and thus further increased acoustic impedances may be generated which would lead to more efficient energy transfer to the acoustic medium. In another embodiment, a single actuator could be situated such that during one phase of its motion it applies displacement into one antinode of the structure and during the opposite phase excites motion at the other antinode. This could be accomplished through mechanical coupling to a flexible surface at the second antinode location. Alternatively, a small pocket of gas could provide coupling to a flexible surface. In another arrangement, the actuator could be designed to operate in an 'S'-shaped mode where half is moving into the structure and half is moving out during one polarity of drive which reverses at the other polarity. This would then be matched to a structure containing out-of-phase antinodes at the surfaces of maximum displacement.

The example cavities described in the previous two paragraphs describe tubular-shaped embodiments of the invention with one primary dimension extending longer than the other two. An advantage of this arrangement is that the cavity need not extend directly normal to the transducing element but can curve if necessary. This acts like a waveguide to direct and steer the acoustic wave while still developing the mode structure necessary to be an effective matching layer. The effective cavity cross-section which helps maintain the acoustic mode will follow the acoustic wave-front through the cavity. An estimate of the path of the cavity mode can be made by connecting an imaginary line from the center of the transducing element to center of the blocking plate through the cavity while maximizing the average distance at any point on the line to the side walls. Taking cross sections using this line as a normal can adequately estimate the mode structure. Bending and altering the cavity cross section can, for instance, enable shrinking the effective spacing in an array arrangement. This could be done by arranging a network of matching cavities from an array of transducers with a given pitch and reducing and skewing the opposite blocking plate side of the cavity so that the pitch is narrower on the aperture side. This embodiment could also be used to change the effective array arrangement from, for example, rectilinear to hexagonal packing.

A further variation on this theme may be considered if the transducer is required to have a wider spread of frequency variability. If there are two axes in which the mode numbers {l, m, n} are non-zero (such as the mode of the first example l=2, m=2, n=0), then the ω for each non-zero axis may be effectively perturbed to shift the peak of the resonant mode to different frequencies when each axis is considered as a separate resonant system. An embodiment of this perturbation of ω may be realized by modifying the geometry internal cavity from a square prism to a rectangular prism, wherein the deviation from a square prism is indicative of the separation of the two resonant peaks. When these peaks are close together, they may be considered as a de facto single (but potentially broader) peak. When these ω deviate, it has the effect of broadening the resonant peak of the output, enabling reduced manufacturing tolerances to be used or allowing the driven frequency to vary from the resonant frequency without experiencing sharp loss of output. This broader response is at the expense of reduced output at the peak frequency.

A similar analysis can be done for an arbitrary shaped structure or cavity. Some, like a cylindrical cavity, can be solved analytically in a way that is similar to the previous examples, while others will need the help of numerical simulations such as finite element analysis to predict where, when and how the appropriate high-pressure antinodes will form. The design goal is to have an acoustic mode which yields a pressure distribution that spatially mimics the displacement of the actuator mounted in the acoustic transducer structure at the desired frequency of oscillation.

If an enclosed cavity is designed to hold and maintain the resonant mode in place, apertures should ideally be added to the surface of the resonant cavity to allow a portion of the acoustic field in the cavity to escape into the bulk medium on every cycle. The exact shape and placement of the apertures does not lend itself to closed-form analytic analysis. In general, the size should be kept small compared to the larger length dimensions of the mode in the cavity so that they do not substantially disturb the cavity mode; apertures that are too large will cause a significant loss of acoustic pressure in the cavity and will cause the desired impedance effect to wane. Too small, however, and not enough acoustic pressure will escape per cycle therefore reducing the efficacy of the cavity as a matching layer. An aperture shape which substantially corresponds to an equiphasic portion of the acoustic mode shape will also help prevent significant disturbance of the mode shape. Some examples of apertures are given in FIGS. 8, 9, and 10. Simulation results for various apertures shapes will be discussed below.

II. Blocking Plate Matching Structures

A. Blocking Plate Structure Design

Figure 7:
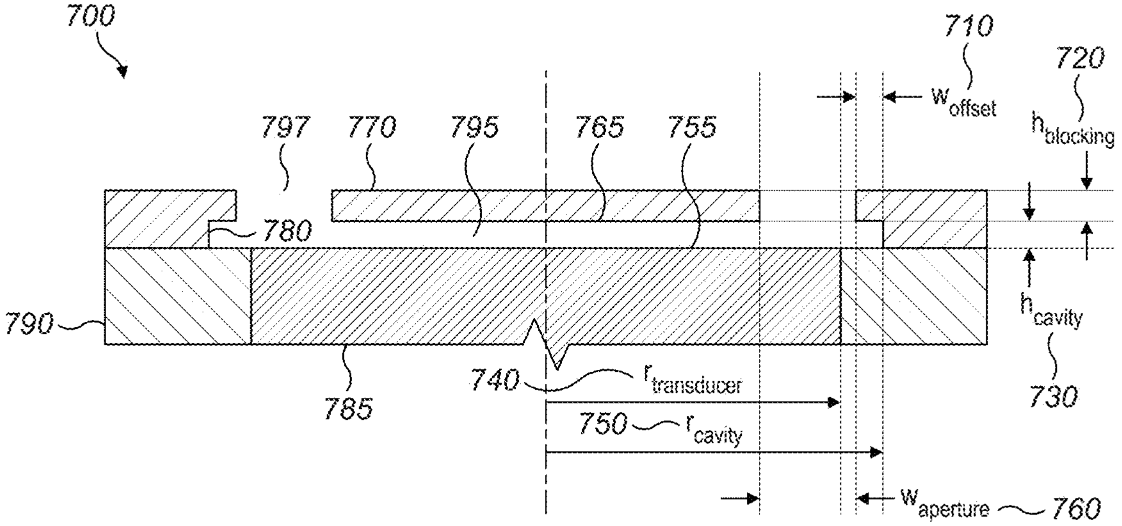
FIG. 7 is a transducing element coupled to an acoustic matching structure including a blocking plate that is an example embodiment of the invention.

FIG. 7 shows a schematic 700 of a transducer coupled to a blocking plate in cross section, which serves to illustrate an embodiment of the invention. A blocking plate structure includes a blocking plate 770 with a side wall 780 and aperture(s) 797. This is situated spaced away from an acoustic transducing element 785 with a surrounding structure 790. The blocking plate is spaced a distance, $h_{cavity}$ 730, in the propagation direction away from the transducing element front face, where $h_{cavity}$ 730 is less than one quarter of the wavelength of acoustic waves in the surrounding medium at the operating frequency. The underside surface of the blocking plate 770 (i.e. on the transducing element side) forms one surface of a thin, planar acoustic cavity, with the spatial extent of the cavity formed by the propagation face of the transducing element 765, the blocking plate 755, and the side walls 790. Operation of the transducing element excites a substantially radial acoustic resonance in the cavity 795 travelling parallel to the blocking plate, which increases the pressure experienced by the front face of the transducing element during the compression phase of its operation as this pressure here is substantially the sum of the ambient pressure and the maximum pressure perturbation due to the resonant mode. (Radial is defined here as being a direction perpendicular to the propagation direction.) The cavity 795 has one or more apertures 797 positioned on the outer surface facing the bulk medium away from its centerline to allow acoustic pressure waves to propagate into the surrounding medium. The aperture(s) 797 is formed by the opening between the blocking plate 770 and the side wall 780. The nominal parameter values for 20 kHz, 65 kHz and 200 kHz embodiments of the transducer shown in FIG. 7 are set forth in Table 2.

TABLE 2

| | Example transducer dimensions (mm) | | |
|---|---|---|---|
| | 20 kHz | 65 kHz | 200 kHz |
| $r_{actuator}$ 740 | 7.50 | 2.50 | 0.80 |
| $r_{cavity}$ 750 | 7.50 | 2.50 | 0.80 |
| $w_{outlet}$ 760 | 2.00 | 0.80 | 0.20 |
| $w_{offset}$ 710 | 0.00 | 0.00 | 0.00 |
| $h_{cavity}$ 730 | 0.25 | 0.20 | 0.10 |
| $h_{blocking}$ 720 | 0.25 | 0.20 | 0.10 |

The blocking plate structure forms a cavity 795 positioned immediately next to the actuating face of the acoustic transducing element assembly which represents the primary transfer surface for moving kinetic energy into the acoustic medium. The acoustic resonant frequency of this cavity in this embodiment is chosen to match the substantially radial mode to increase the power radiated by the transducer into the propagation medium. This is possible because the small cavity 795 between the transducing element and the blocking front plate of FIG. 7 increases the amplitude of pressure oscillation generated within that cavity 795 by the motion of the transducer. This improves the coupling (and therefore efficiency of power transfer) between the higher acoustic impedance transducer and the lower acoustic impedance medium constrained within the structure (which is typically the same as the propagation medium). This acoustic power propagates into the surrounding medium via the one or more aperture(s) 797.

Figure 8:
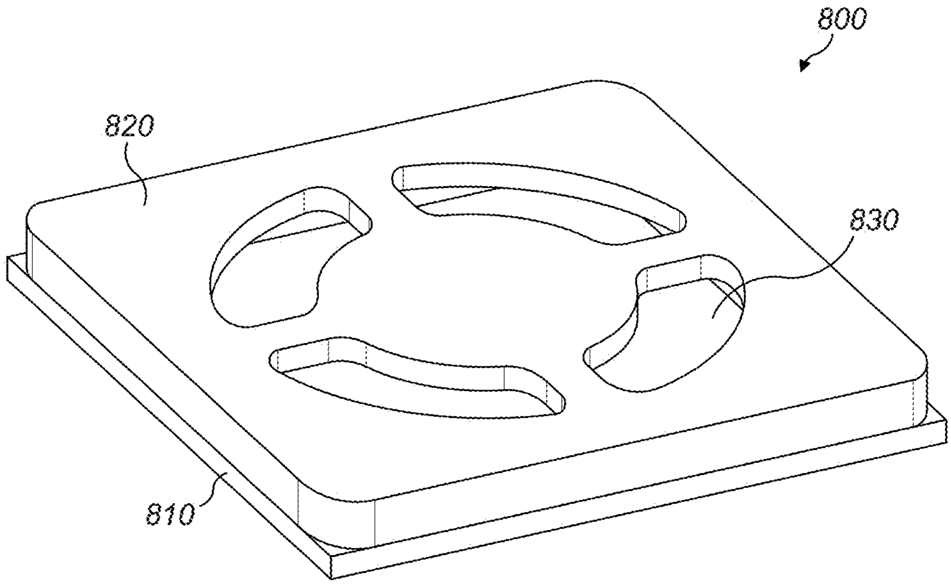
FIG. 8 is a transducing element coupled to an acoustic matching structure that generates the desired acoustic resonant mode and which includes a blocking plate with annular apertures.
Figure 9:
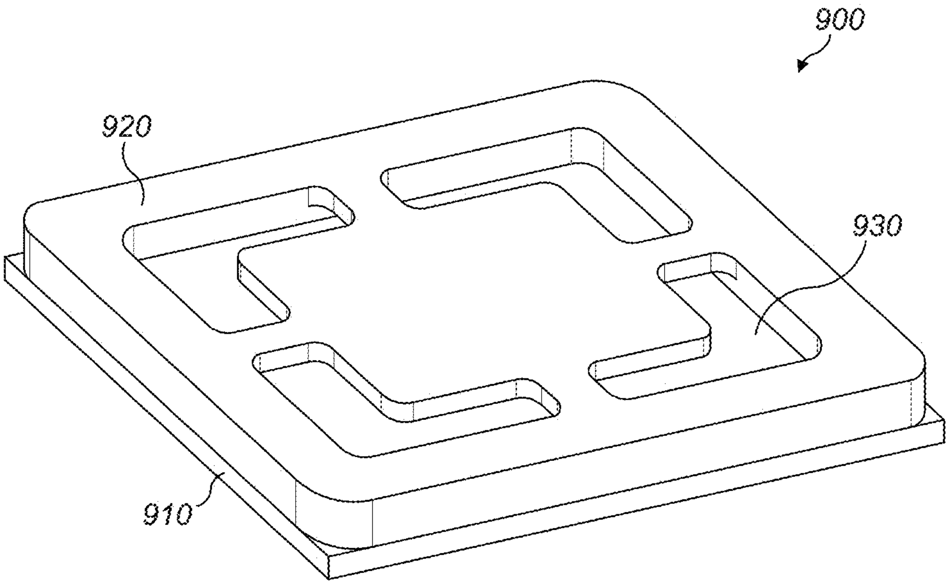
FIG. 9 is a transducing element coupled to an acoustic matching structure that generates the desired resonant mode which includes a blocking plate with non-annular apertures.
Figure 10:
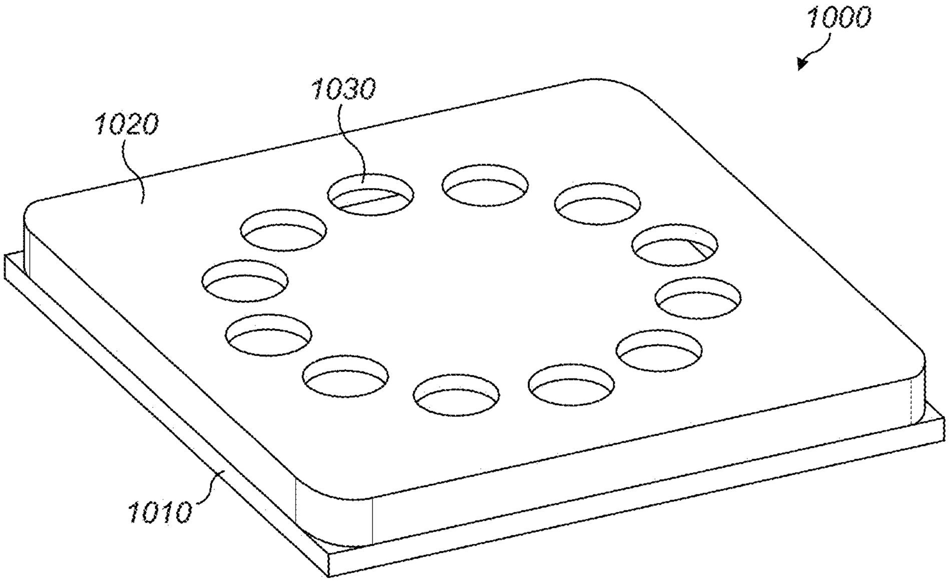
FIG. 10 is a transducing element coupled to an acoustic matching structure that generates the desired resonant mode which includes a blocking plate with a radial distribution of apertures.

Aperture examples are shown in FIGS. 8, 9 and 10.

FIG. 8 shows a schematic 800 with a transducing element 810 coupled to an acoustic structure whose upper surface 820 has annular-shaped apertures 830.

FIG. 9 shows a schematic 900 with a transducing element 910 coupled to an acoustic structure whose upper surface 920 has non-annular-shaped apertures 930.

FIG. 10 shows a schematic 1000 with a transducing element 1010 coupled to an acoustic structure whose upper surface 1020 has circular apertures 1030 positioned on a circular pitch.

Figure 11:
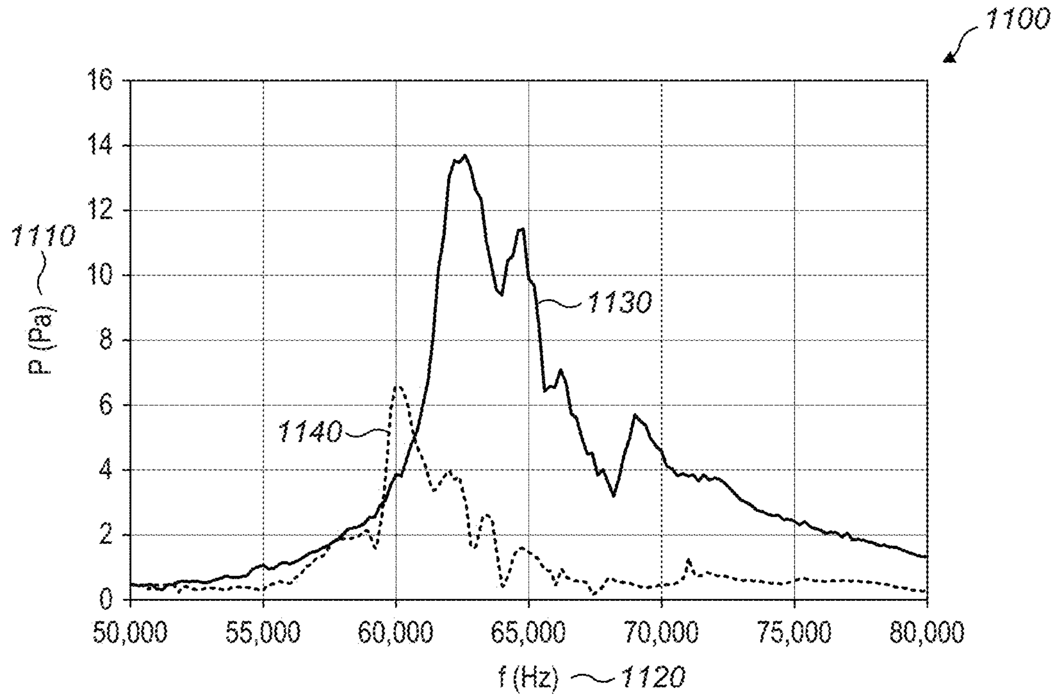
FIG. 11 is a graph showing on-axis pressure measurements with and without an acoustic matching structure.
Figure 12:
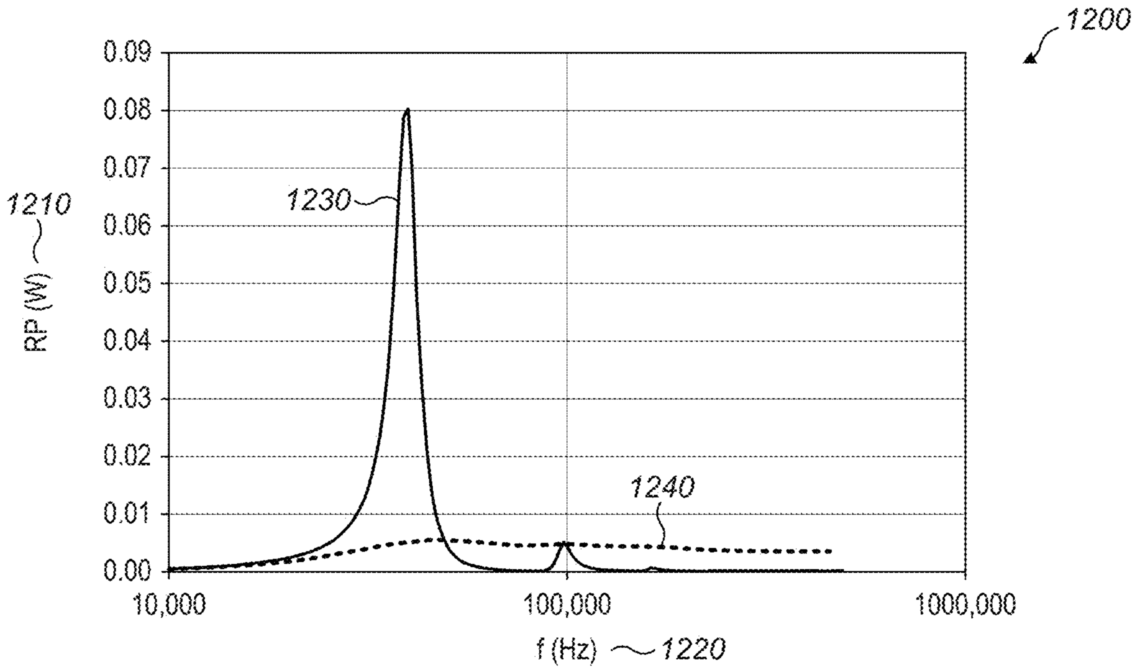
FIG. 12 is a graph showing radiated power calculated using a simulation with and without an acoustic matching structure.

FIGS. 11 and 12 demonstrate with experimental data and numerical simulation respectively that, over a certain frequency range, both on-axis acoustic pressure and radiated acoustic power in this $L_x \approx L_y >> L_z$ design are greater with the use of the blocking plate structure that embodies the invention than without.

FIG. 11 shows a graph 1100 of the measured on-axis acoustic pressure with and without the embodied invention. The x-axis 1120 is frequency in Hz. The y-axis 1110 is the on-axis acoustic pressure at 30 cm in Pa. The plot shows the on-axis acoustic pressure measured 30 cm from the transducer as a function of frequency for a transducer with the acoustic structure which embodies the invention 1130 and without this structure 1140. The graph 1100 shows that, for almost all frequencies between 50 kHz and 80 kHz, the on-axis acoustic pressure at 30 cm is higher for a transducer with a blocking plate that embodies the invention than without. The on-axis acoustic pressure is significantly higher when the blocking plate structure in used between about 62 kHz to about 66 kHz in this embodiment.

FIG. 12 shows a graph 1200 of the simulated on-axis acoustic power with and without the blocking plate. The x-axis 1220 is frequency in Hz. The y-axis 1210 is radiated power in W. The plot shows radiated power as a function of frequency for a transducer with the blocking plate 1230 and without the blocking plate 1240. The graph 1200 shows that, for frequencies between about 60 kHz and about 90 kHz, the radiated power is significantly higher with the blocking plate than without.

Further, it is possible to tune the frequency of the acoustic resonance of the cavity that, when coupled to the transducing element that has its own operating frequency, may provide desirable characteristics of the acoustic output (e.g. broadband, high on-axis pressure, high radiated acoustic power). The transducing element operating frequency may be different from the acoustic resonant frequency. When the resonant frequency of the cavity and the operating frequency of the transducing element are closely matched, the radiated acoustic power is greatest. A further performance improvement may be realized if the transducing element and acoustic cavity resonance are mode-shape matched, i.e. the displacement profile of the transducing element oscillation is substantially similar to the pressure mode shape of the acoustic resonance excited in the medium.

It may also be advantageous to use a mix of a frequency that activates the impedance matching effect and one or more further frequencies that constitute the desired output (which may also be in conjunction with multiple transducing elements). Due to the impedance matching effect, this would not behave linearly when compared to each of the frequency components in isolation, and so in applications where design simplicity, small size and high output efficiency is important while the high ultrasonic frequencies may be disregarded, such as in small speaker units, this may be used to achieve more commercially viable designs.

Figure 13:
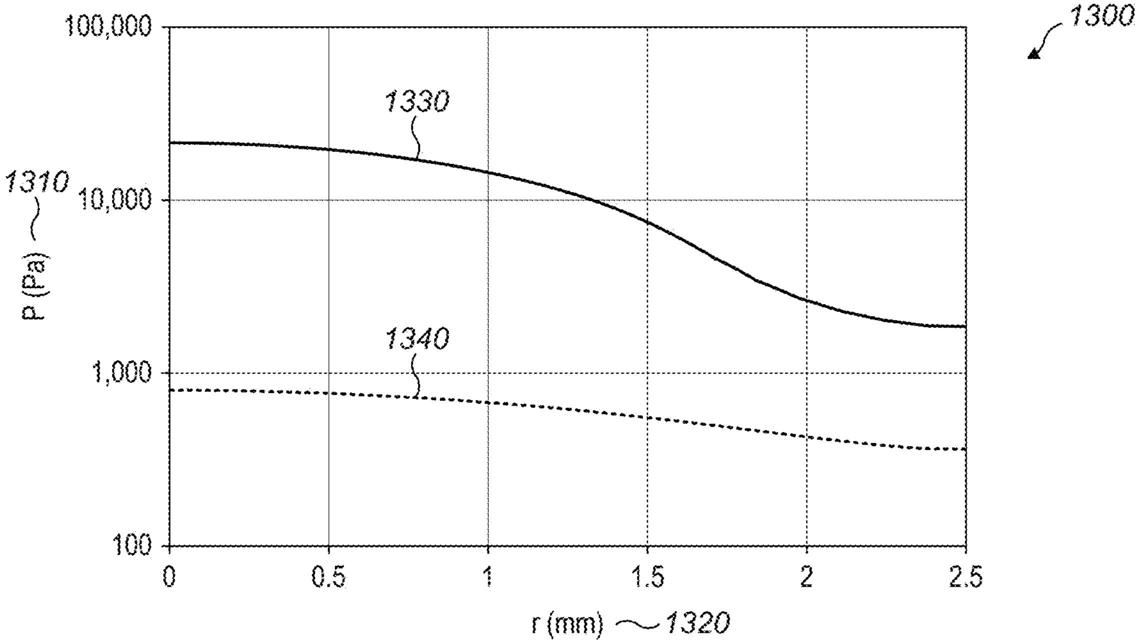
FIG. 13 is a graph showing radial mode pressure distribution in an axisymmetric simulation of a transducer including an acoustic matching structure appropriate to this transducer structure.

FIG. 13 shows a graph 1300 of the magnitude of pressure oscillations at the propagation face of transducers with and without a blocking plate (which is part of a structure that is the embodiment) in an axisymmetric simulation. In this case the blocking plate and side walls are circularly symmetric. The x-axis 1320 is the distance in mm of the radial line on the transducer face starting from the center. The y-axis 1310 is the absolute acoustic pressure in Pa. The plot shows absolute acoustic pressure of the transducer as a function of the radial distance between the center (r=0 mm) and edge (r=2.5 mm) of the transducer with the blocking plate 1330 and without the blocking plate 1340. The graph 1300 shows that absolute acoustic pressure without the blocking plate is essentially constant at about 750 Pa. In contrast, absolute pressure with the blocking plate ranges from about 21000 Pa at r=0 mm and gradually falls to about 2000 Pa at r=2.5 mm. The data shown is taken from an axisymmetric pressure acoustics finite element model (COMSOL) for two otherwise identical piston mode actuators.

From this it can be seen that matching the displacement profile to the mode shape is not an absolute requirement for the blocking plate and surrounding structure to be effective, since the radiated power from a simple piston-mode actuator (e.g. piezoelectric actuator in thickness-mode) can be increased by the presence of the blocking plate with surrounding structure as shown in FIG. 12.

B. Blocking Plate Coupled to Bending-Mode Piezoelectric Actuator

Figure 14A:
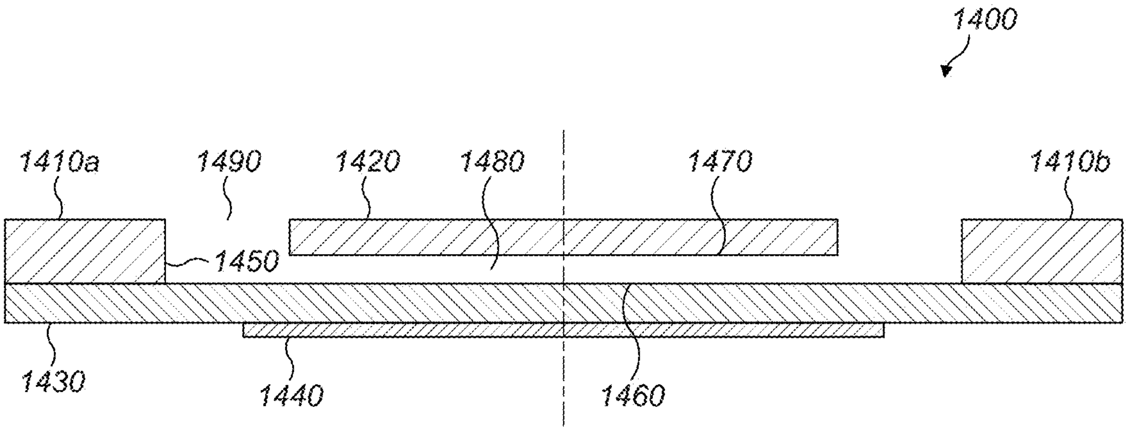
FIG. 14A is a cross-section of transducer including a piezoelectric bending-mode actuator coupled to an acoustic matching structure appropriate to this actuator.

FIG. 14A shows a schematic 1400 of a cross-section embodiment of a blocking plate when coupled to a bending-mode piezoelectric actuator. The blocking plate structure includes a blocking plate 1420, side walls 1450 and aperture(s) 1490, mounted using a supporting structure 1410*a*, 1410*b*, and spaced away from an acoustic actuator comprising a substrate 1430 and a piezoelectric transducing element 1440.

Figure 14B:
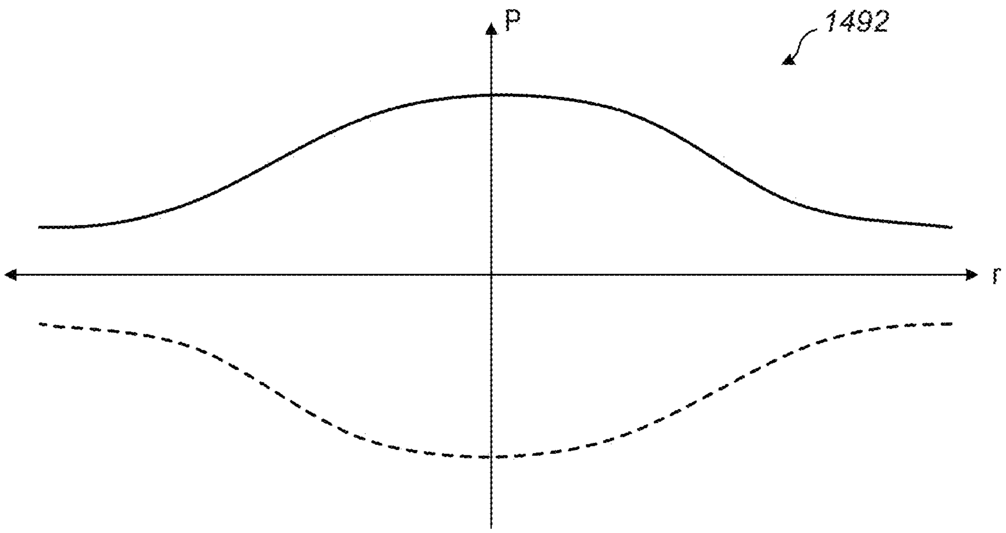
FIG. 14B shows the radial dependence of the pressure oscillation within the resonant acoustic cavity.
Figure 14C:
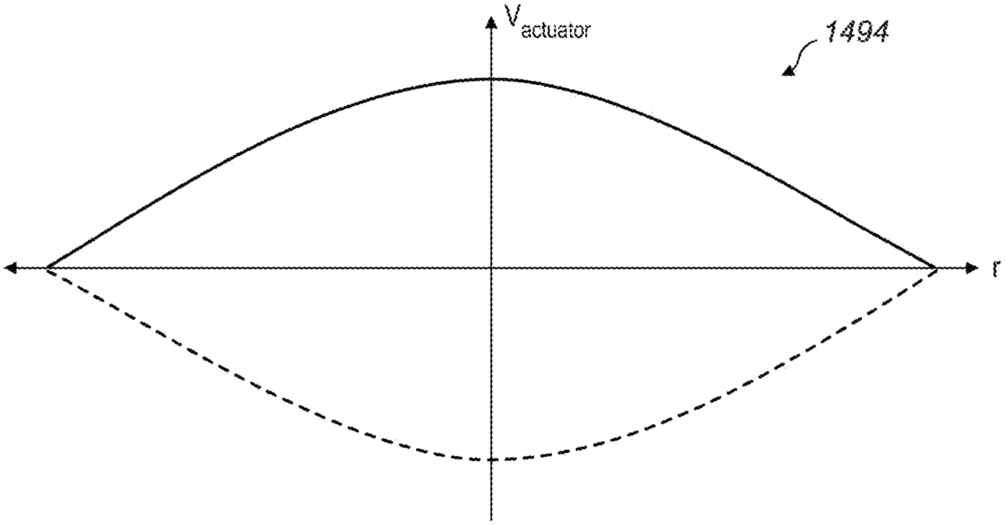
FIG. 14C shows the radial dependence of the bending-mode actuator velocity.

FIG. 14B is a graph 1492 showing the radial dependence of the pressure oscillation within the resonant acoustic cavity. FIG. 14C is a graph 1494 showing the radial dependence of the bending-mode actuator velocity.

In this embodiment, the displacement profile of the actuator is well-matched to the radial mode acoustic pressure distribution in the cavity. In addition, the blocking plate structure is used to define the motion of the actuator as well as the geometry of the cavity. The blocking plate structure heavily constrains motion of the actuator at the perimeter of the cavity where the structure becomes substantially stiffer, owing to the greater thickness of material in this region. The structure similarly does not constrain motion at the center of the actuator where the center of the cavity and thus the high-pressure antinode is located. This allows the displacement of the actuator to follow the desired bending shape when actuated, which is very similar in profile to the acoustic pressure distribution depicted in FIG. 13. Consequently, the blocking plate serves a dual function: providing mechanical support for the actuator and creating an acoustic matching structure. This further reduces the height of the whole system.

1. Tuning the Resonant Frequency

Returning to FIG. 7, the cavity resonance can be tuned by changing the cavity radius, $r_{cavity}$ 750. This can be different than the transducing element radius $r_{transducer}$ 740, This allows the transducing element to be designed separately from the cavity, since the resonant frequency of the cavity, $f_{acoustic}$, varies as $$f_{acoustic} \sim \frac{1}{r_{cavity}}.$$

Table 3 below shows example dimensions to tune to cavity to 3 different frequencies of operation.

While not necessary, the transducing element radius and cavity radius are typically chosen to be the same. Table 3 shows that the $r_{cavity}$ 750 can be either sub-wavelength or greater than a wavelength, while still increasing the radiated acoustic power over a transducing element with no blocking plate.

TABLE 3

| $r_{cavity}$ (mm) | $w_{aperture}$ (mm) | Frequency at peak output (Hz) | Corresponding wavelength (mm) | Comment |
|---|---|---|---|---|
| 1.5 | 0.05 | 44,500 | 7.7 | Sub-wavelength cavity radius |
| 5.0 | 4 | 100,500 | 3.4 | Larger than wavelength cavity radius |

Table 3 shows that, for a given blocking plate and supporting structure thickness $h_{blocking}$ 720 and cavity height $h_{cavity}$ 730 (both 0.2 mm), radiated power can be increased by a cavity with radius either substantially smaller than or greater than the target wavelength. Data is taken from a two-dimensional axisymmetric simulation about the centerline of the transducer using a pressure acoustics finite element model (COMSOL).

Figure 15:
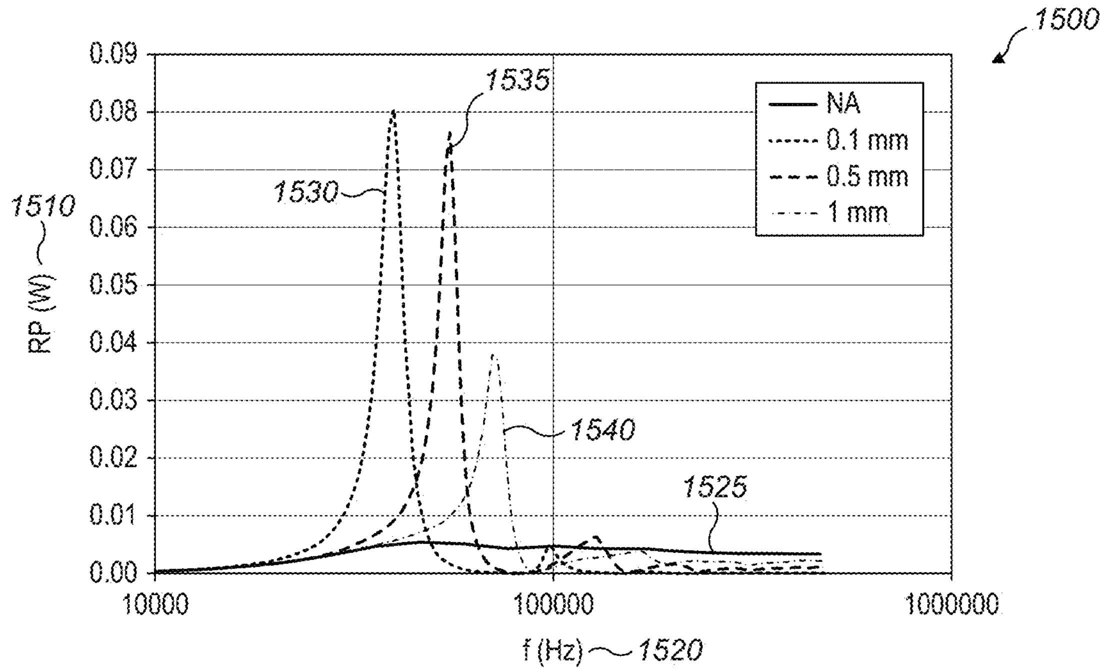
FIG. 15 is a graph showing radiated power in a simulation detailing dependencies on the parameters of the apertures in the embodiment.

In addition to $r_{cavity}$, the width of $w_{aperture}$ 760 can be used to tune the resonant frequency of the cavity. FIG. 15 is a graph 1500 showing radiated power dependence on the width of $w_{aperture}$ and frequency. The x-axis 1520 is frequency in Hz. The y-axis 1510 is radiated power in W. The plot shows radiated power of the transducer as a function of the frequency at a $w_{aperture}$=0.01 mm 1530, 0.05 mm 1535, 0.1 mm 1540, 0.5 mm 1545, 1 mm 1550, 1.5 mm 1555, and 2 mm 1560. A baseline 1525 without blocking plate is shown for comparison. The graph 1500 shows that a $w_{aperture}$ of 0.1 mm produces the highest radiated power of 0.040 W at a frequency of about 50 kHz. No other $w_{aperture}$ produces a radiated power greater than 0.020 W at any tested frequency. Data was taken from a two-dimensional axisymmetric simulation about the centerline of the transducer using a pressure acoustics finite element model (COMSOL) where the transducing element is considered to be a simple piston moving at a preset velocity at each frequency.

The central region must still be partially blocked by the blocking front plate, such that the width of the aperture, $W_{aperture}<0.9r_{cavity}$. Yet there also exists a lower limit on the width of the outlet, relating to the oscillatory boundary layer thickness $$\delta \approx \sqrt{\frac{v}{\pi f}}$$

(where v is the kinematic viscosity of the medium), at the operating frequency, f, such that $w_{aperture}>2\delta$. Below this value, a significant proportion of the acoustic energy is lost via viscous dissipation at the outlet.

Figure 16:
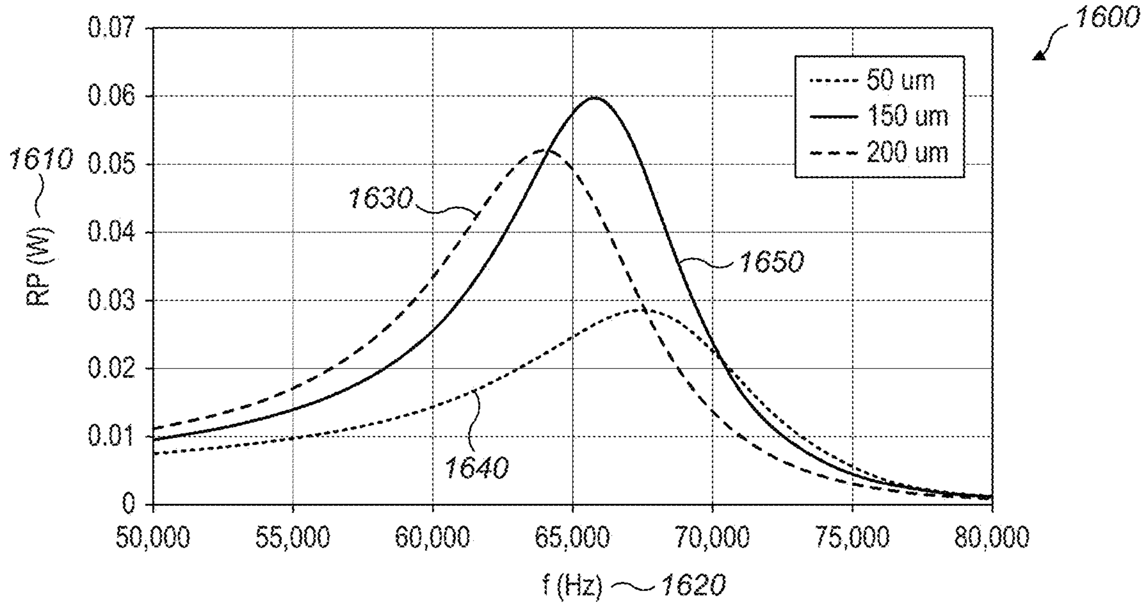
FIG. 16 is a graph showing radiated power in a simulation with frequency response when the height of the cavity, $h_{cavity}$ in the embodiment is varied.

The resonant frequency of the radial acoustic mode excited is only weakly dependent on the cavity height, $h_{cavity}$ (730), as shown in FIG. 16. FIG. 16 is a graph 1600 of the effect of cavity height on the frequency response of the acoustic energy radiated through the blocking plate structure into the medium. The x-axis 1620 is frequency in Hz. The y-axis 1610 is radiated power in W. The plot shows radiated power of the transducer as a function of the frequency at $h_{cavity}$ of 50 μm 1630, 100 μm 1640, 150 μm 1650, and 200 μm 1660. The graph shows that the functions for $h_{cavity}$ of 100 μm 1640, 150 μm 1650, and 200 μm 1660 are quite similar. Data for FIG. 16 is modeled spectra from a two-dimensional axisymmetric simulation about the centerline of the transducer using a pressure acoustics finite element model of a piston transducer coupled with the blocking plate.

Taking an example from FIG. 16, when the cavity height $h_{cavity}$, is increased from 100 μm to 200 μm, the simulated resonant frequency only changes by 5%. Therefore, its resonant frequency can be tuned relatively independently of the total thickness of the matching structure, unlike the previously attempted solutions described above. In addition, an improvement in transmission efficiency can be shown over a large frequency range with a fixed cavity height, as shown in Table 4.

TABLE 4

| Frequency (Hz) | Baseline radiated power (mW) | Radiated power with blocking (mW) | Power increase (dB) | aperture width (mm) |
|---|---|---|---|---|
| 10,000 | 0.4 | 0.5 | 0.5 | 0.05 |
| 12,900 | 0.7 | 0.9 | 0.9 | 0.05 |
| 16,700 | 1.2 | 1.8 | 1.6 | 0.05 |
| 21,500 | 2.0 | 4.1 | 3.1 | 0.05 |
| 27,800 | 3.3 | 14.7 | 6.5 | 0.05 |
| 35,900 | 4.7 | 39.9 | 9.3 | 0.10 |
| 46,400 | 5.5 | 18.5 | 5.3 | 0.50 |
| 59,900 | 5.1 | 19.0 | 5.7 | 0.50 |
| 77,400 | 4.4 | 13.3 | 4.8 | 1.00 |
| 100,000 | 4.8 | 13.9 | 4.6 | 1.50 |
| 129,000 | 4.4 | 4.8 | 0.4 | 2.00 |
| 167,000 | 4.3 | 5.3 | 0.9 | 2.00 |
| 215,000 | 3.8 | 3.8 | 0.0 | 2.40 |

Table 4 shows that, for a given blocking plate thickness and cavity height (both=0.2 mm), radiated acoustic power can be increased by the blocking plate over a large range of frequencies. Aperture width is adjusted to maximize radiated power for each frequency. Data is taken from a two-dimensional axisymmetric simulation about the centerline of the transducer using a pressure acoustics finite element model (COMSOL).

A similarly lower limit on the cavity height exists as with the aperture channel width, namely that the viscous penetration depth places a rough lower limit on the cavity size, namely $h_{cavity}>2\delta$, for identical reasoning to before. An upper bound on the cavity height is also required to ensure the dominant acoustic resonant mode is the designed radial mode. This requires $$h_{cavity} < \frac{\lambda}{4},$$

where λ is the acoustic wavelength at the transducer operating frequency.

These limitations on the cavity height $h_{cavity}$ also have bearing on other embodiments of this invention which may not be planar, may not have the same configuration of dimensions or may not even have a similar intended resonant mode. As before, the viscous penetration depth will limit the thinness of the thinnest dimension of the structure available, dissipating more of the energy as heat as the viscous penetration depth is reached as the minimal limit of the internal dimensions of the structure or cavity. Other thin modes generated will also require that their thinnest dimension has substantially similar limitations in order to achieve the correct mode constrained by the structure, as each mode intended will have specific dimensional requirements. Moving too far from these requirements may cause a jump in the resonant mode excited and thus deleteriously affect the efficiency obtained from the addition of the tuned structure as described previously in this document.

Figure 17C:
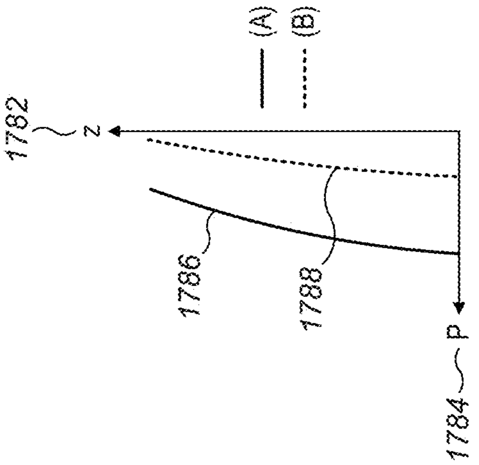
FIG. 17C shows how the amplitude of pressure oscillations in a cavity varies along the longitudinal axis.
Figure 17B:
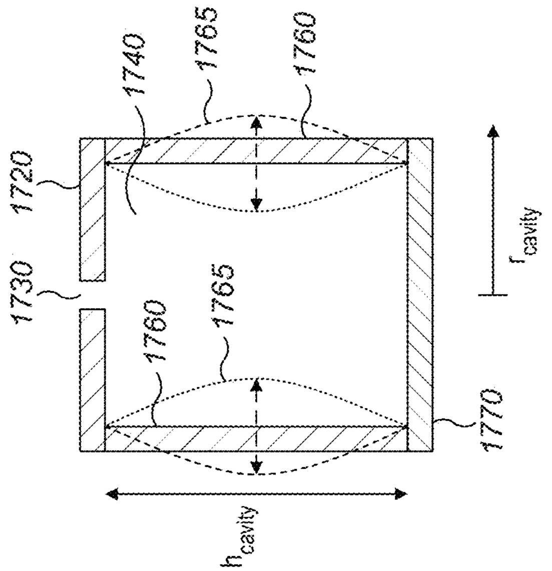
FIGS. 17A and 17B are a cross-section of a transducer including a tubular cavity with cylindrical side-walls.
Figure 17A:
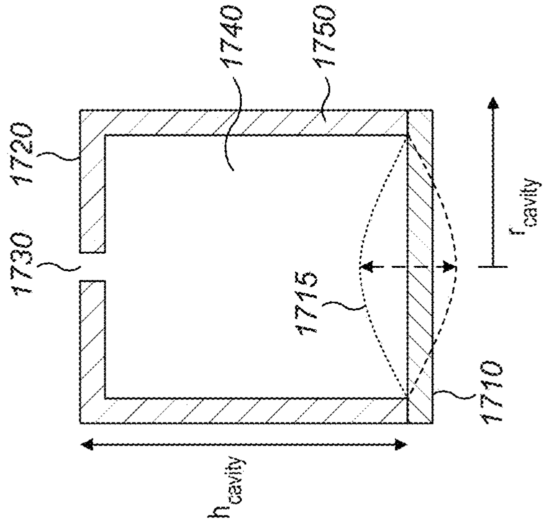

FIGS. 17 and 18 relate to transducers using an alternative longitudinal embodiment of the acoustic matching structure, in which the radius of the acoustic cavity is smaller than the height of the acoustic cavity. FIG. 17A shows an axisymmetric view of a transducer. An actuator, 1710, mates to one end of a hollow tube, 1750, at its perimeter. A blocking plate, 1720, then mates with the opposite end of the tube. An acoustic cavity, 1740, is formed by the combination of the actuator, tube, and blocking plate. There is a small aperture, 1730, in the blocking plate to allow pressure waves to radiate into the surrounding medium. Longitudinal oscillatory motion of the actuator (motion indicated by 1715) generates longitudinal pressure waves in the cavity. The frequency of these pressure oscillations can be adjusted so that a longitudinal acoustic resonance is excited in the cavity, increasing their amplitude. This resonant frequency will principally be dependent on the cavity's height, the radius of the cavity will have a smaller effect.

FIG. 17B shows an axisymmetric view of a transducer. A hollow cylindrical actuator, 1760, mates to a base, 1770, at one end. A blocking plate, 1720, then mates with the opposite end of the actuator. An acoustic cavity, 1740, is formed by the combination of the actuator, base, and blocking plate. There is a small aperture, 1730, in the blocking plate to allow pressure waves to radiate into the surrounding medium. Radial motion of the actuator indicated by 1765 generates longitudinal pressure waves in the cavity. The frequency of these pressure oscillations can be adjusted so that a longitudinal acoustic resonance is excited in the cavity, increasing their amplitude. This resonant frequency will principally be dependent on the cavity's height, the radius of the cavity will have a smaller effect. This configuration has the advantage of providing the actuator with a larger surface area which enables higher acoustic output than the configuration shown in FIG. 17A.

FIG. 17C shows how the amplitude of pressure oscillations 1784 in the cavity varies along the longitudinal axis 1782, from the actuator to the aperture, for two cases: (A) with the blocking plate present 1786 (B) without the blocking plate present 1788. In both cases a first-order acoustic resonance is excited where the amplitude of pressure oscillations reduces monotonically from the closed to the open end of the tube. However, the amplitude is materially higher for the case where the blocking plate is present, and notably so at the aperture where the pressure waves radiate into the surrounding medium. The actuator may be a thickness-mode piezoelectric actuator, where, once driven, its motion is approximately uniform and in-phase across its area. It is this motion that generates longitudinal pressure waves in the cavity.

Figure 18A:
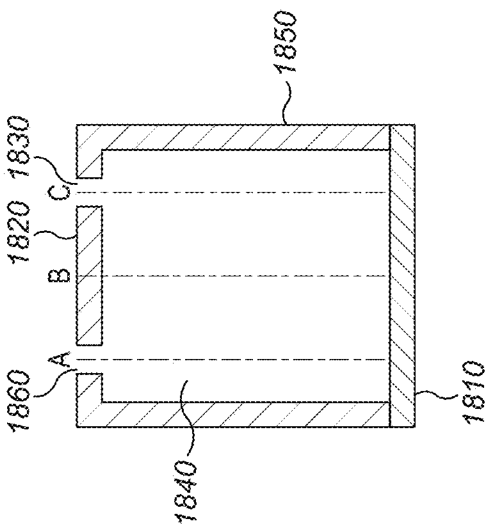
FIGS. 18A is a cross-section of a transducer including an acoustic cavity driven with a higher order acoustic resonant mode.

FIG. 18A shows an axisymmetric view of a transducer. An actuator, 1810, mates to one end of a hollow tube, 1850, at its perimeter. A blocking plate, 1820, then mates with the opposite end of the tube. An acoustic cavity, 1840, is formed by the combination of the actuator, tube, and blocking plate. There are two small apertures, 1830 and 1860, in the blocking plate to allow pressure waves to radiate into the surrounding medium. In this case, and in contrast to FIG. 17, motion of the actuator excites a higher order acoustic resonance in the cavity.

Figure 18B:
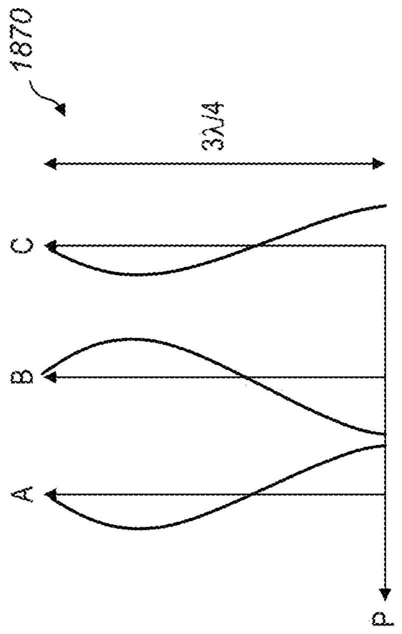
FIG. 18B is a graph that shows how the phase of pressure oscillations varies along three parallel axes.
Figure 18C:
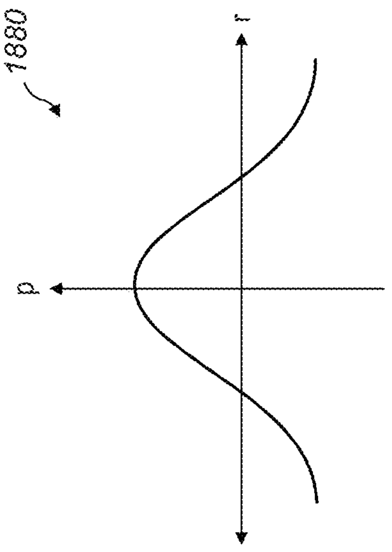
FIG. 18C shows the phase of pressure oscillations.

FIG. 18B is a graph 1870 that shows how the phase of pressure oscillations varies along three parallel axes, A, B, and C. Along each axis, the pressure is highest close to the actuator but is out of phase with the pressure at the opposite end of the tube. There is no aperture positioned along axis B as pressure radiated from an aperture at this position would be out of phase with the pressure radiated from apertures 1830 and 1860, which would cause destructive interference and lower the transducer's total pressure output.

The phase of pressure oscillations varies in the longitudinal and radial directions. In the radial direction, at a given z height, the pressure at the center of the cavity is out of phase with the pressure close to the tube's inner circumference as shown in the graph 1880 of FIG. 18C.

Figure 18D:
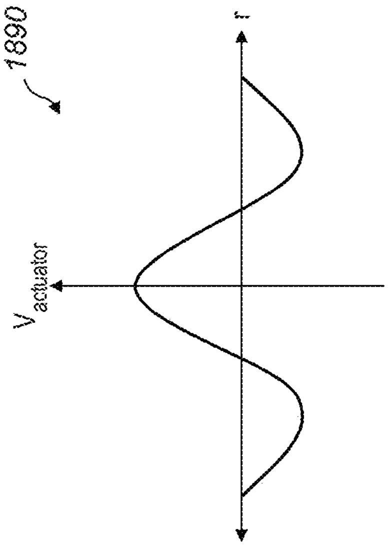
FIG. 18D shows the velocity profile of an actuator.

FIG. 18D shows the velocity profile 1890 of an actuator that is mode-shape matched to the acoustic resonance described, where the phase of the actuator's oscillations varies across its radius; in-phase at its center, and out-of-phase close to its perimeter. In this instance, a bending-mode piezoelectric actuator could be used to generate such a velocity profile.

Figure 19A:
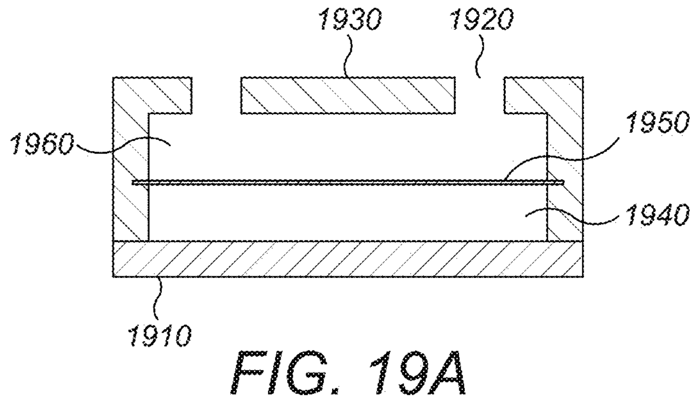
FIGS. 19A, 19B and 19C show cross-sections of a transducer with resonant acoustic cavity and blocking plate combined with a thin film matching layer.

FIG. 19A shows a transducer comprising an actuator and a matching structure that is a combination of the blocking plate and thin film matching structures. The thin film, 1950, is spaced a short distance away from the actuator, 1910, to a form a sealed acoustic cavity, 1940. The blocking plate 1930 is spaced a short distance from the opposite side of the thin film, to form a separate acoustic cavity 1960 with aperture 1920. The combination of the two matching structures may improve the acoustic transmission efficiency of the transducer.

Figure 19B:
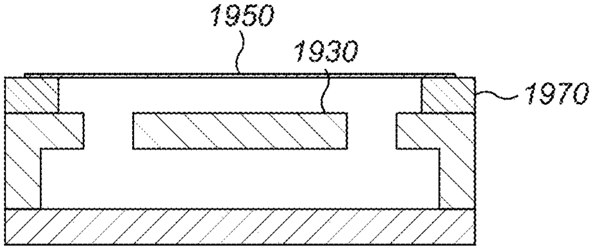

Similarly, FIG. 19B shows a transducer comprising an actuator and a matching structure that is a combination of the blocking plate 1930 and thin film 1950 matching structures. However, in this embodiment, the positions of the blocking plate 1930 and thin film 1950 are reversed, such that it is the blocking plate 1930 that is closest to the actuator, and the thin film 1950 radiates pressure directly into the surrounding medium. The thin film is positioned a short distance away from the blocking plate 1930 by a spacer element, 1970.

Figure 19C:
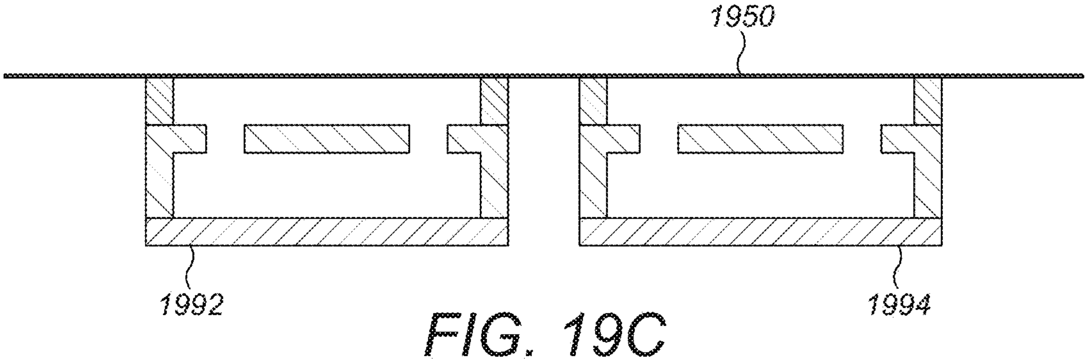

FIG. 19C shows two neighboring transducers 1992, 1194, each with the same configuration as in FIG. 19B, but with a continuous thin film 1950 shared between the two transducers. This may be advantageous if arrays of transducers are being manufactured as the thin film 1950 could be laminated to the transducer array as a final assembly without requiring further processing.

Figure 20A:
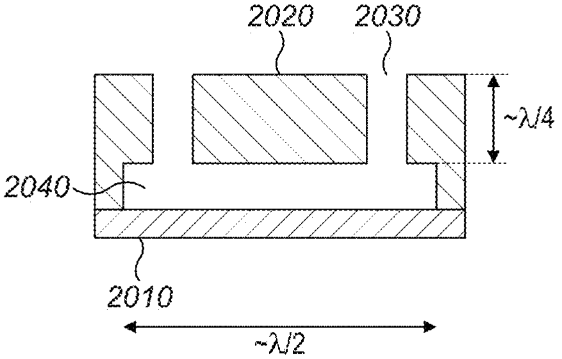
FIGS. 20A, 20B and 20C show cross-sections of a transducer including an acoustic cavity and blocking plate combined with a plate with an array of holes.

FIG. 20A shows a transducer comprising an actuator, 2010, and the blocking plate matching structure. The blocking plate, 2020, has a thickness that is approximately one quarter of a wavelength of the pressure oscillations in the acoustic medium. For example, this medium may be air. Therefore, the aperture, 2030, has a length equal to one quarter of a wavelength. A longitudinal acoustic resonance could be excited in the aperture, in addition to the radial resonance excited in the cavity, 2040, formed by the actuator and blocking plate. This additional longitudinal resonance could amplify the pressure output further.

Figure 20B:
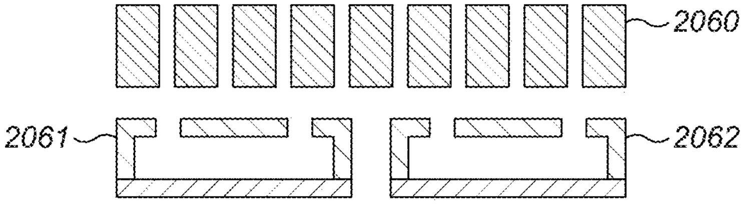

FIG. 20B shows two transducers 2061, 2062, each comprising an actuator and a blocking plate matching structure, with a separate perforated plate, 2060, arranged in front of both transducers. The additional perforated plate may act as an additional matching structure and further improve the efficiency of acoustic transmission. It may also act as a protective barrier against, for example, accidental damage to the transducers, or dirt ingress into them.

Figure 20C:
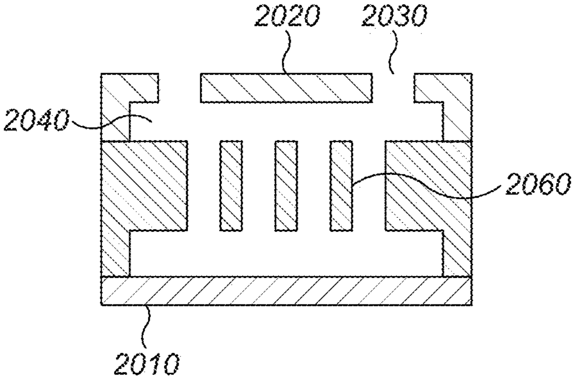

FIG. 20C shows a transducer comprising an actuator and matching structure that is a combination of the blocking plate 2020 and perforated plate 2060 matching structures. The perforated plate 2060 is spaced a short distance from the actuator 2010. The blocking plate 2020 is spaced a short distance from the opposite side of the perforated plate, forming a cavity 2040 with an aperture 2030. The combination of the two matching structures may improve the acoustic transmission efficiency of the transducer.

Figure 21:
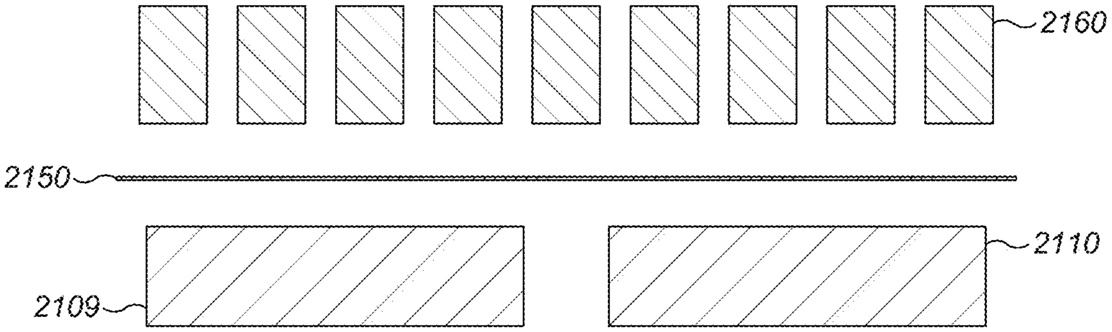
FIG. 21 shows multiple transducers combined with both thin film and plate with holes matching layer structures.

FIG. 21 shows two actuators 2109, 2110, arranged close to one another, with a continuous thin film, 2150, positioned in front of them, and a continuous perforated plate, 2160, positioned in front of that. The combination of the two matching structures may improve the acoustic transmission efficiency of the transducer(s). Furthermore, as both the thin film and perforated plate are shared by multiple actuators, the ease of assembly of transducer arrays may be improved.

2. Advantages of the Blocking Plate

The frequency of operation of the blocking plate matching structure is dependent largely on the in-plane dimensions ($r_{cavity}$, $w_{aperture}$) and is relatively invariant to the thickness dimensions ($h_{cavity}$, $h_{blocking}$). (For typical matching layers/structures, it is the thickness that is the critical parameter.) This allows the matching structure with the blocking plate to have a lower thickness and thus in this embodiment a lower profile than other matching layers across a wide frequency range. The matching structure with the blocking plate can be manufactured with conventional manufacturing techniques and to typical tolerances, again in contrast to other more conventional matching layers/structures. It is unintuitive that adding a blocking plate can improve acoustic output, given that a large fraction of the propagation area of the transducing element is blocked by the plate itself The advantages of the acoustic structure including the blocking plate relative to the alternative matching structures detailed above are described below.

1. Conventional matching layers are typically close to $$\frac{\lambda}{4}$$

(where λ denotes the primary wavelength required of the acoustic transducer) thick, whereas the novel acoustic structure including the blocking plate described here can achieve improve transmission efficiency with a thinner structure. In addition, conventional impedance matching layers require complex manufacturing processes to produce the low acoustic impedance materials, whereas the novel acoustic structure described herein can be manufactured using conventional processes e.g. machining, injection molding, etching. Furthermore, low acoustic impedance materials typically lack robustness, whereas the required structure to implement this invention can be fabricated out of more rigid and robust engineering materials such as aluminum.

2. The blocking plate can achieve performance improvements with a thinner structure than a plate with a regular array of sub-wavelength holes as described in Toda, particularly at low ultrasonic frequencies.
3. In the case of the thin film matching layer described in Toda, performance depends strongly on dimensions parallel to the propagation direction. This may be limiting at high frequencies (>>80 kHz), where the spacing of the thin film from the transducing element requires tight tolerances that are not reasonably achievable. However, the blocking plate and supporting structure can be manufactured with typical industry tolerances in at least machining and etching. Moreover, thin polymer films lack robustness, whereas the blocking plate with its supporting structure can be fabricated out of a single piece of a more rigid and robust engineering materials such as aluminum.
4. The acoustic structure described can achieve the same or greater performance improvements with a thinner structure than an acoustic horn, particularly at low ultrasonic frequencies.
5. Helmholtz resonators are limited by the requirement that the dimensions of the resonator must be substantially smaller than the wavelength at the operating frequency. This requires a substantially sub-wavelength transducing element, which limits the power output and constrains what transducing elements can be used with this matching concept. The supporting structure and blocking plate that forms the cavity in this embodiment are not required to be substantially sub-wavelength in diameter so can accommodate larger transducing elements. One of the differences between the foregoing design and a Helmholtz resonator is that this design drives an acoustic resonance that does not have spatially uniform pressure (in the case of this invention it must harbor a chosen acoustic mode that has substantially non-uniform acoustic pressure with radial pressure variation) which then has an opening/pipe at the far end. This has been in previous sections shown to be generalizable to any structure with a non-uniform pressure (pipe, sphere, horn, etc.). This encompasses any enclosed volume with a mode structure and an opening.

III. Summary of Example Embodiments of the Invention

One embodiment of the invention is an acoustic matching structure comprising a cavity which, in use, contains a fluid, the cavity having a substantially planar shape. The cavity is defined by two end walls bounding the substantially planar dimension and a side wall bounding the cavity and substantially perpendicular to the end walls, with the cavity having an area $A_{cavity}$ given by the average cross-sectional area in the planar dimension in the cavity between the end walls. The side wall of the cavity may be circular or may have another shape in which case the effective side wall radius $r_{cavity}$ defined as: $r_{cavity}=(A_{cavity}/\pi)^{1/2}$. At least one aperture is placed in at least one of the end walls and side walls; wherein the cavity height $h_{cavity}$ is defined as the average separation of the end walls, and $r_{cavity}$ and $h_{cavity}$, satisfy the inequality: $r_{cavity}$ is greater than $h_{cavity}$. In operation, a transducing element acting on one of the cavity end walls generates acoustic oscillations in the fluid in the cavity; and, in use, the acoustic oscillations in the fluid in the cavity cause pressure waves to propagate into a surrounding acoustic medium.

A further embodiment of the invention is an acoustic matching layer comprising: a cavity which, in operation, contains a fluid, the cavity having a substantially planar shape with two end walls bounding the substantially planar dimension and an area $A_{cavity}$ given by the average cross-sectional area in the planar dimension of the cavity between the end walls. One of the end walls may be formed by a transducing element and another may be formed by a blocking plate. The cavity has an effective side wall radius $r_{cavity}$ defined as: $r_{cavity}=(A_{cavity}/\pi)^{1/2}$ and the cavity height heavily is defined as the average separation of the end walls. In operation, the cavity supports a resonant frequency of acoustic oscillation in the fluid, wherein the frequency determines a wavelength defined by $$\lambda = \frac{c}{f},$$

where c is the speed of sound in the fluid, wherein $h_{cavity}$ is substantially less than half a wavelength wherein $r_{cavity}$ is substantially equal to or greater than half a wavelength, and at least one aperture is placed in at least one of the end walls and side walls, at least one acoustic transducing element is located on at least one of the end walls and side walls. The resulting acoustic cavity constrains the acoustic medium in the cavity to induce a resonant mode that substantially improves the transfer of acoustic energy from the transducing element to the medium outside the aperture.

A further embodiment of the invention is an acoustic matching layer comprising: a cavity which, in operation, contains a fluid, the cavity having a substantially tubular shape, two end walls bounding the ends of the tubular dimension, wherein a centerline is defined as a line within the cavity which connects the geometric center of one end wall to the geometric center of the other end wall and traverses the cavity in such a way that it maximizes its distance from the nearest boundary excluding the end walls at each point along its length, an area $A_{cavity}$ given by the average cross-sectional area of the cavity between the end walls where the cross-sections are taken with a normal along the centerline, wherein the cavity has an effective side wall radius $r_{cavity}$ defined as: $r_{cavity}=(A_{cavity}/\pi)^{1/2}$; wherein the cavity height $h_{cavity}$ is defined as the length of the centerline, wherein, in operation, the cavity supports a resonant frequency of acoustic oscillation in the fluid wherein the frequency determines a wavelength defined by $$\lambda = \frac{c}{f},$$

where c is the speed of sound in the fluid wherein $r_{cavity}$ is substantially less than half a wavelength, wherein $h_{cavity}$ is substantially equal to or greater than half a wavelength. At least one aperture is placed in at least one of the end walls and side walls and at least one acoustic transducing element is located on at least one of the end walls and side walls. The resulting acoustic cavity constrains the acoustic medium in the cavity to induce a resonant mode that substantially improves the transfer of acoustic energy from the transducing element to the medium outside the aperture A further embodiment of the invention is an acoustic matching layer comprising: a blocking plate present in the path of acoustic energy transfer into the bulk medium; wherein, in operation, the presence of the blocking plate excites an acoustic mode; wherein at least one axis has a dimension that is substantially less than half a wavelength at the resonant frequency in the cavity, and; wherein at least one axis has a dimension that is substantially equal to or greater than half a wavelength at the resonant frequency in the cavity.

In any of the above embodiments, the transducing element may be an actuator which causes oscillatory motion of one or both end walls in a direction substantially perpendicular to the planes of the end walls.

Embodiments below relate to longitudinal and other (not-radial) cavity modes.

One embodiment is acoustic matching structure comprising: a cavity which, in operation, contains a fluid, the cavity having a substantially tubular shape, two end walls bounding the ends of the tubular dimension, wherein a centerline is defined as a line within the cavity which connects the geometric center of one end wall to the geometric center of the other end wall and traverses the cavity in such a way that it maximizes its distance from the nearest boundary excluding the end walls at each point along its length.

The cavity area $A_{cavity}$ given by the average cross-sectional area of the cavity between the end walls where the cross-sections are taken with a normal along the centerline, wherein the cavity has an effective side wall radius $r_{cavity}$ defined as: $r_{cavity}=(A_{cavity}/\pi)^{1/2}$; wherein the cavity height $h_{cavity}$ is defined as the length of the centerline, wherein, in operation, the cavity supports a resonant frequency of acoustic oscillation in the fluid; wherein the frequency determines a wavelength defined by $$\lambda = \frac{c}{f},$$

where c is the speed of sound in the fluid, $r_{cavity}$ is substantially less than half a wavelength, $h_{cavity}$ is substantially equal to or greater than half a wavelength. At least one aperture is placed in at least one of the end walls and side walls, and at least one acoustic transducing element is located on at least one of the end walls and side walls. The resulting acoustic cavity constrains the acoustic medium in the cavity to induce a resonant mode that substantially improves the transfer of acoustic energy from the transducing element to the medium outside the aperture.

A further embodiment is an acoustic matching structure comprising: a blocking plate present in the path of acoustic energy transfer into the bulk medium; wherein, in operation, the presence of the blocking plate excites an acoustic mode; wherein at least one axis has a dimension that is substantially less than half a wavelength at the resonant frequency in the cavity, and; wherein at least one axis has a dimension that is substantially equal to or greater than half a wavelength at the resonant frequency in the cavity.

IV. Additional Disclosure

1. An acoustic matching structure for a transducer, the structure comprising:
a cavity which, in use, contains a fluid, the cavity having a substantially planar shape;
two end walls bounding the substantially planar shape of the cavity
a side wall bounding the cavity and substantially perpendicular to the end walls;
the structure defining an area $A_{cavity}$ given by the average cross-sectional area in the planar dimension in the cavity between the end walls
wherein the cavity has an effective side wall radius $r_{cavity}$ defined as:

$$r_{cavity}=(A_{cavity}/\pi)^{1/2};\text{ and}$$

at least one aperture placed in at least one of the end walls and side walls;
wherein the cavity height $h_{cavity}$ is defined as the average separation of the end walls;
wherein $r_{cavity}$ and $h_{cavity}$, satisfy the inequality:
$r_{cavity}$ is greater than $h_{cavity}$;
wherein, in operation, a transducing element acting on one of the cavity end walls generates acoustic oscillations in the fluid in the cavity;
and whereby, in use, the acoustic oscillations in the fluid in the cavity cause pressure waves to propagate into a surrounding acoustic medium.

2. An acoustic matching structure according to claim 1,
wherein, in operation, the cavity supports a resonant frequency of acoustic oscillation in the fluid, wherein: the resonant frequency determines a wavelength defined by $$\lambda = \frac{c}{f},$$

where c is the speed of sound in the fluid; where $h_{cavity}$ is substantially less than half of said wavelength and
where $r_{cavity}$ is substantially equal to or greater than half of said wavelength;
at least one aperture is placed in at least one of the end walls and side walls; and
at least one acoustic transducing element is located on at least one of the end walls and side walls;
such that the resulting acoustic cavity constrains the acoustic medium in the cavity to induce a resonant mode that substantially improves the transfer of acoustic energy from the transducing element to the medium outside the aperture.

3. An acoustic matching structure according to claim 1 or 2, wherein the transducer contains an actuator that causes oscillatory motion of at least one of the end walls in a direction substantially perpendicular to the planes of the end walls.

4. An acoustic matching structure according any of the above claims wherein at least one aperture is located in an end wall within a distance less than $r_{cavity}/2$ from the side wall.

5. An acoustic matching structure according to any of the above claims wherein the shape is one of: circular, elliptical, square, polygonal shape, with an aspect ratio of less than 2.

6. An acoustic matching structure according to any of the above claims wherein the sum of the areas of the aperture(s), $A_{aperture}$, and $A_{cavity}$ satisfy the inequality: $A_{cavity}/A_{aperture}$ is greater than 2, and preferably wherein $A_{activity}/A_{aperture}$ is than greater 5.

7. An acoustic matching structure according to any of the above claims wherein $r_{cavity}/h_{cavity}$ is greater than 5.

8. An acoustic matching structure according to any of the above claims wherein the fluid contained in the cavity is air and the speed of sound is between 300 m/s and 400 m/s.

9. An acoustic matching structure according to any of the above claims wherein $h_{cavity}{}^2/r_{cavity}$ is greater than $10^{-8}$ meters.

10. An acoustic matching structure according to any of the above claims, wherein, in use, lowest resonant frequency of radial pressure oscillations in the cavity is in the range 200 Hz-2 MHz, and preferably in the range 20 kHz-200 kHz.

11. An acoustic transducer comprising an acoustic matching structure according to any of the above claims, and an actuator, wherein, in use, the frequency of oscillatory motion of the actuator is within 30% of the lowest resonant frequency of radial acoustic oscillations in the cavity.

12. An acoustic transducer according to claim 11, wherein the end wall motion of the actuator is mode-shape matched to the pressure oscillation in the cavity.

13. An acoustic transducer according to claim 11 or 12, wherein the actuator causes motion of an end-wall with a displacement profile approximating a Bessel function.

14. An acoustic transducer according to any of claims 11 to 13, wherein, in use, the acoustic pressure oscillations in the cavity have a pressure antinode located within a distance of $r_{cavity}/4$ of the centre of the cavity.

15. An acoustic transducer according to any of claims 11 to 14, wherein aperture(s) in the cavity wall connect, in use, the internal cavity volume to a surrounding acoustic medium.

16. An acoustic transducer according to any of claims 11 to 15, wherein the aperture(s) are located in an end wall formed by a blocking plate supported at its edge and spaced away from the transducing element by the side wall and located between the cavity and a surrounding acoustic medium.

17. An acoustic transducer according to any of claims 11 to 16, wherein the actuator is located between the cavity and a surrounding acoustic medium and the aperture(s) are located in an end wall formed by one face of the actuator.

18. An acoustic transducer according to any of claims 11 to 17, wherein the displacement of the actuator follows a bending shape when actuated.

19. An acoustic transducer according to any of claims 11 to 18, wherein motion of edge of the actuator is constrained by the actuator support.

20. An acoustic transducer according to any of claims 11 to 19, wherein motion of the center of the actuator is unconstrained.

21. An acoustic transducer according to any of claims 11 to 20, wherein the transducing element is one of: a piezoelectric actuator, an electromagnetic actuator, an electrostatic actuator, a magnetostrictive actuator, a thermoacoustic transducing element.

22. An acoustic transducer according to any of claims 11 to 21, wherein motion of the actuator support is constrained by a blocking plate.

23. An acoustic transducer according to claim 22 further comprising a thin film matching structure positioned between the transducing element and the blocking plate.

24. An acoustic transducer according to claim 22 or 23 further comprising a thin film matching structure positioned between the blocking plate and the external acoustic medium.

25. An acoustic transducer according to claim 22, further comprising a perforated plate matching structure containing apertures of approximately λ/4 height positioned between the transducing element and the blocking plate.

26. An acoustic according to claim 22 further comprising a perforated plate matching structure containing apertures of approximately λ/4 height positioned between the blocking plate and the external acoustic medium.

27. An array of acoustic matching structures or transducers according to any of the above claims.

V. Conclusion

While the foregoing descriptions disclose specific values, any other specific values may be used to achieve similar results. Further, the various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An acoustic matching structure for a transducer, the structure comprising:

a cavity which, in use, contains a fluid, the cavity having a substantially flat cylindrical shape;

two end walls bounding the substantially planar shape of the cavity;

at least one side wall bounding the cavity;

a side wall bounding the cavity and substantially perpendicular to the end walls;

the structure defining an area $A_{cavity}$ given by the average cross-sectional area in the planar dimension in the cavity within the at least one side wall;

wherein the cavity has an effective side wall radius $r_{cavity}$ defined as:

$$r_{cavity}=(A_{cavity}/\pi)^{1/2};\text{ and}$$

at least one aperture placed within the at least one side wall;

wherein the cavity height $h_{cavity}$ is defined as the average separation of the end walls;

wherein $r_{cavity}$ and $h_{cavity}$, satisfy the inequality:

$r_{cavity}$ is greater than $h_{cavity}$;

wherein an area of one of the at least one aperture ($A_{aperture}$), and $A_{cavity}$ satisfy the inequality:

$$A_{cavity}/A_{aperture}\text{ is greater than 2;}$$

wherein, in operation, a transducing element acting on one of the cavity end walls generates acoustic oscillations in the fluid in the cavity; and whereby, in use, the acoustic oscillations in the fluid in the cavity cause pressure waves to propagate into a surrounding acoustic medium.

2. The acoustic matching structure according to claim 1, wherein, in operation, the cavity supports a resonant frequency of acoustic oscillation in the fluid;

wherein the resonant frequency determines a wavelength defined by $$\lambda = \frac{c}{f},$$

where c is the speed of sound in the fluid;

where $h_{cavity}$ is substantially less than half of said wavelength and where $r_{cavity}$ is substantially equal to or greater than half of said wavelength;

at least one aperture is placed in within the at least one side wall; and at least one acoustic transducing element is located within the at least one side wall;

such that the resulting acoustic cavity constrains the surrounding acoustic medium in the cavity to induce a resonant mode that substantially improves the transfer of acoustic energy from the transducing element to the medium outside the aperture.

3. The acoustic matching structure according to claim 1, wherein substantially flat cylindrical shape has an aspect ratio of less than 2.

4. The acoustic matching structure according to claim 1, wherein $r_{cavity}$ $|h_{cavity}$ is greater than 5.

5. The acoustic matching structure according to claim 1, wherein the fluid contained in the cavity is air and the speed of sound is between 300m/s and 400m/s.

6. The acoustic matching structure according to claim 1, wherein $h_{cavity}^2/r_{cavity}$ is greater than 10-8 meters.

7. The acoustic matching structure according to claim 1, wherein, in use, lowest resonant frequency of radial pressure oscillations in the cavity is in the range 200 Hz-2 MHz.

8. The acoustic matching structure according to claim 1, wherein the transducing element is one of: a piezoelectric actuator, an electromagnetic actuator, an electrostatic actuator, a magnetostrictive actuator, a thermoacoustic transducing element.

9. An acoustic matching structure for a transducer, the acoustic matching structure comprising:

1) a cavity which, in use, contains a fluid, the cavity having a substantially flat cylindrical shape;

two end walls bounding the substantially planar shape of the cavity;

at least one side wall bounding the cavity;

the structure defining an area $A_{cavity}$ given by the average cross-sectional area in the planar dimension in the cavity within the at least one side wall;

wherein the cavity has an effective wall radius $r_{cavity}$ defined as:

$$r_{cavity}=(A_{cavity}/\pi)^{1/2};\text{ and}$$

at least one aperture placed within the at least one side wall;

wherein the cavity height $h_{cavity}$ is defined as the average separation of the end walls;

wherein $r_{cavity}$ and $h_{cavity}$, satisfy the inequality:

cavity is greater than $h_{cavity}$, wherein an area of one of the at least one aperture ($A_{aperture}$), and $A_{cavity}$ satisfy the inequality:

$$A_{cavity}/A_{aperture}\text{ is greater than 2}$$

wherein, in operation, a transducing element acting on one of the cavity end walls generates acoustic oscillations in the fluid in the cavity; and whereby, in use, the acoustic oscillations in the fluid in the cavity cause pressure waves to propagate into a surrounding acoustic medium;

2) an actuator, wherein, in use, a frequency of oscillatory motion of the actuator is within 30% of a lowest resonant frequency of radial acoustic oscillations in the cavity.

10. The acoustic matching structure according to claim 9, wherein the actuator causes motion of one of the end walls with a displacement profile approximating a Bessel function.

11. The acoustic matching structure according to claim 9, wherein, in use, acoustic pressure oscillations in the cavity have a pressure antinode located within a distance of $r_{cavity}/4$ of a center of the cavity.

12. The acoustic matching structure according to claim 9, wherein displacement of the actuator follows a bending shape when actuated.

13. The acoustic matching structure according to claim 9, wherein motion of an edge of the actuator is constrained by an actuator support.

14. The acoustic matching structure according to claim 9, wherein motion of a center of the actuator is unconstrained.

15. The acoustic matching structure according to claim 9, wherein the transducing element is one of: a piezoelectric actuator, an electromagnetic actuator, an electrostatic actuator, a magnetostrictive actuator, a thermoacoustic transducing element.

16. The acoustic matching structure according to claim 13, wherein motion of the actuator support is constrained by a blocking plate.

17. The acoustic matching structure according to claim 16, further comprising a thin film matching structure positioned between the transducing element and the blocking plate.

18. The acoustic matching structure according to claim 16, further comprising a thin film matching structure positioned between the blocking plate and the surrounding acoustic medium.

19. The acoustic matching structure according to claim 16, further comprising a perforated plate matching structure containing apertures of approximately $\lambda/4$ height positioned between the transducing element and the blocking plate.

20. The acoustic matching structure according to claim 16, further comprising a perforated plate matching structure containing apertures of approximately $\lambda/4$ height positioned between the blocking plate and the surrounding acoustic medium.

* * * * *